(12) United States Patent
Bang et al.

(10) Patent No.: US 10,713,105 B2
(45) Date of Patent: Jul. 14, 2020

(54) OPERATING METHOD OF MEMORY CONTROLLER, STORAGE DEVICE INCLUDING THE SAME, AND OPERATING METHOD OF STORAGE DEVICE

(71) Applicant: SAMSUNG ELECTRONICS CO., LTD., Suwon-si, Gyeonggi-do (KR)

(72) Inventors: Kwangkyu Bang, Suwon-si (KR); Young-Seop Shim, Seoul (KR); Heeyoub Kang, Seoul (KR); Kyungduk Lee, Incheon (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 210 days.

(21) Appl. No.: 15/961,918

(22) Filed: Apr. 25, 2018

(65) Prior Publication Data

US 2019/0079816 A1     Mar. 14, 2019

(30) Foreign Application Priority Data

Sep. 13, 2017 (KR) .................. 10-2017-0117390

(51) Int. Cl.
  *G06F 11/00* (2006.01)
  *G06F 11/07* (2006.01)
  *G06F 3/06* (2006.01)

(52) U.S. Cl.
  CPC .......... *G06F 11/006* (2013.01); *G06F 3/0653* (2013.01); *G06F 11/073* (2013.01); *G06F 11/0772* (2013.01); *G06F 11/0787* (2013.01)

(58) Field of Classification Search
  CPC . G06F 11/3037; G06F 11/0727; G06F 11/073
  See application file for complete search history.

(56) References Cited

U.S. PATENT DOCUMENTS

| | | | |
|---|---|---|---|
| 6,035,401 A * | 3/2000 | Dalvi .................. | G06F 12/1433 711/163 |
| 6,601,132 B2 | 7/2003 | Nomura et al. | |
| 7,093,064 B2 * | 8/2006 | Dalvi .................. | G06F 12/1433 711/103 |
| 7,372,758 B2 | 5/2008 | Yaoi et al. | |
| 7,599,241 B2 | 10/2009 | Sprouse et al. | |
| 7,899,987 B2 | 3/2011 | Salomon et al. | |
| 7,962,824 B2 | 6/2011 | Nakanishi et al. | |
| 8,559,234 B2 | 10/2013 | Kumazaki et al. | |

(Continued)

FOREIGN PATENT DOCUMENTS

| JP | H08-022422 A | 1/1996 |
|---|---|---|
| KR | 10-0904491 B1 | 6/2009 |

(Continued)

*Primary Examiner* — Christopher S McCarthy
(74) *Attorney, Agent, or Firm* — Volentine, Whitt & Francos, PLLC

(57) ABSTRACT

An operating method of a memory controller to control a nonvolatile memory device includes receiving information about operation failure from the nonvolatile memory device, receiving lock-out status information from the nonvolatile memory device, determining whether a lock-out signal is output based on the lock-out status information, and determining a failure block corresponding to the information about the operation failure as a normal block or a bad block depending on the determination result.

19 Claims, 17 Drawing Sheets

(56) References Cited

U.S. PATENT DOCUMENTS

| | | |
|---|---|---|
| 8,605,533 B2 | 12/2013 | Seo |
| 8,661,301 B1 | 2/2014 | Yen |
| 8,750,055 B2 | 6/2014 | Kim et al. |
| 8,897,092 B2 | 11/2014 | Chu |
| 8,953,383 B2 | 2/2015 | Yeo et al. |
| 9,070,443 B2 | 6/2015 | Park |
| 9,317,212 B2 | 4/2016 | Huffman et al. |
| 9,373,366 B2 | 6/2016 | Son |
| 9,390,805 B2 * | 7/2016 | Jo ........................ G11C 16/225 |
| 2007/0083697 A1 | 4/2007 | Birrell et al. |

FOREIGN PATENT DOCUMENTS

| | | |
|---|---|---|
| KR | 10-2010-0035327 A | 4/2010 |
| KR | 10-2012-0052029 A | 5/2012 |

* cited by examiner

OPERATING METHOD OF MEMORY CONTROLLER, STORAGE DEVICE INCLUDING THE SAME, AND OPERATING METHOD OF STORAGE DEVICE

CROSS-REFERENCE TO RELATED APPLICATIONS

A claim for priority under 35 U.S.C. § 119 is made to Korean Patent Application No. 10-2017-0117390 filed Sep. 13, 2017, in the Korean Intellectual Property Office, the entirety of which is hereby incorporated by reference.

BACKGROUND

Embodiments of the inventive concept described herein relate to a semiconductor memory, and more particularly, to an operating method of a memory controller, a storage device including the memory controller, and an operating method of the storage device.

Semiconductor memory devices may be classified into volatile memory devices such as a static random access memory (SRAM), dynamic RAM (DRAM), and synchronous DRAM (SDRAM) which lose data stored therein when powered-off, and nonvolatile memory devices such as read only memory (ROM), programmable ROM (PROM), electrically programmable ROM (EPROM), electrically erasable and programmable ROM (EEPROM), flash memory devices, phase-change RAM (PRAM), magnetic RAM (MRAM), resistive RAM (RRAM), and ferroelectric RAM (FRAM) which retain data stored therein even when powered-off.

Flash memory devices are widely used as mass storage of computing systems. Flash memory operates using an external power supply voltage provided from the outside. In the case where the power supply voltage becomes unstable due to various factors, the reliability of data stored in the flash memory or the reliability of data to be stored therein may not be secured.

SUMMARY

Embodiments of the inventive concepts provide an operating method of a memory controller, a storage device including the memory controller, and an operating method of the storage device, capable of improving reliability.

Embodiments of the inventive concepts provide an operating method of a memory controller which controls a nonvolatile memory device. The operating method includes receiving, by the memory controller, information about operation failure from the nonvolatile memory device; determining, by the operation controller, a memory block of the nonvolatile memory device corresponding to the information about the operation failure as a failure block; receiving, by the memory controller, lock-out status information from the nonvolatile memory device; determining, by the memory controller, whether a lock-out signal is output, based on the lock-out status information; and determining, by the memory controller, the failure block as a normal block or a bad block depending on the determining whether the lock-out signal is output.

Embodiments of the inventive concepts further provide an operating method of a storage device including a memory controller which controls a nonvolatile memory device. The operating method includes performing, by the memory controller, an operation from among a program operation, a read operation, and an erase operation on a memory block of the nonvolatile memory device; determining, by the memory controller, the memory block as a failure block when the operation fails; determining, by the memory controller, whether a lock-out signal is output by the nonvolatile memory device, when the operation fails; and determining the failure block as a normal block or a bad block depending on the determining whether the lock-out signal is output.

Embodiment of the inventive concepts still further provide a storage device including a nonvolatile memory device including a plurality of memory blocks; and a memory controller configured to control the nonvolatile memory device. The memory controller is further configured to determine whether a lock-out signal is output by the nonvolatile memory device based on lock-out status information from the nonvolatile memory device; determine a memory block, from among the plurality of memory blocks, corresponding to information about operation failure received from the nonvolatile memory device as a failure block; and determine the failure block as a normal block or a bad block depending on whether the lock-out signal is output.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Example embodiments of the inventive concept will now be described in detail with reference to the accompanying drawings.

As is traditional in the field of the inventive concepts, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concepts. Likewise, the blocks of the embodiments may be physically combined into more complex blocks without departing from the scope of the inventive concepts.

Figure 1:
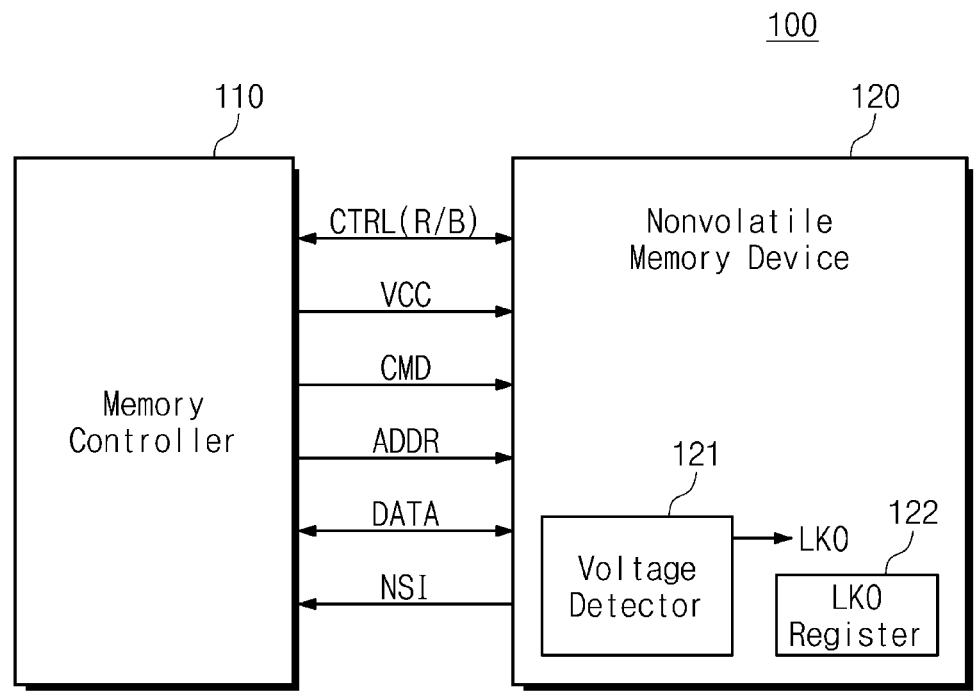
FIG. 1 illustrates a block diagram of a storage device according to an embodiment of the inventive concept.

FIG. 1 illustrates a block diagram of a storage device 100 according to an embodiment of the inventive concept. Referring to FIG. 1, the storage device 100 includes a memory controller 110 and a nonvolatile memory device 120.

The memory controller 110 may store data in the nonvolatile memory device 120, may read data stored in the nonvolatile memory device 120, or may erase data stored in the nonvolatile memory device 120. For example, the memory controller 110 may provide the nonvolatile memory device 120 with a power supply voltage VCC needed for the nonvolatile memory device 120 to operate. The memory controller 110 may transmit a command CMD and an address ADDR to the nonvolatile memory device 120 to store data (DATA) in the nonvolatile memory device 120, to read data stored in the nonvolatile memory device 120, or to erase data stored in the nonvolatile memory device 120.

The memory controller 110 may transmit a reset command to the nonvolatile memory device 120 to reset the nonvolatile memory device 120. The reset command may be included in the command CMD or may be provided to the nonvolatile memory device 120 through a separate signal line. The memory controller 110 may receive state information RB (e.g., ready/busy), which indicates a state of an operation being performed in the nonvolatile memory device 120, from the nonvolatile memory device 120. In the case where the nonvolatile memory device 120 is at a busy state, the memory controller 110 may not transmit the command CMD or a control signal CTRL.

The nonvolatile memory device 120 may receive a power supply voltage VCC, the command CMD, and the address ADDR from the memory controller 110. In response to the received signals, the nonvolatile memory device 120 may store data from the memory controller 110, may provide data stored therein to the memory controller 110, or may erase data stored therein. The nonvolatile memory device 120 may perform a reset operation in response to a reset command received from the memory controller 110.

Below, a description will be given under the assumption that the power supply voltage VCC is provided from the memory controller 110. However, the scope and spirit of the inventive concept should not be limited thereto. For example, in some embodiments the power supply voltage VCC may be provided from a separate power supply device (not illustrated).

The nonvolatile memory device 120 includes a voltage detector 121 and a lock-out (LKO) status register 122. The voltage detector 121 detects whether the power supply voltage VCC from the memory controller 110 is lower than a reference voltage. For example, the power supply voltage VCC provided from the memory controller 110 may be lower than the reference voltage due to various factors such as a troublesome or faulty external power source device, a troublesome or faulty power circuit of the memory controller 110, a wiring issue, a faulty internal circuit of the nonvolatile memory device 120, or sudden interruption of power supplied from the outside.

In an embodiment of the inventive concepts, the voltage detector 121 may be a lock-out circuit included in the nonvolatile memory device 120. In the case where the power supply voltage VCC is lower than the reference voltage, the voltage detector 121 may output a lock-out signal LKO. The nonvolatile memory device 120 may perform a recovery operation, based on whether the lock-out signal LKO is output. For example, the nonvolatile memory device 120 may stop an operation (e.g., a program operation, a read operation, or an erase operation) based on whether the lock-out signal LKO is output and may enter a stable operation standby state.

In the case where the power supply voltage VCC decreases to a specific voltage or lower, the nonvolatile memory device 120 may fail to operate normally. Accordingly, there is a decrease in the reliability of data stored in the nonvolatile memory device 120 or data to be stored therein. In this case, the nonvolatile memory device 120 may perform the recovery operation based on whether the lock-out signal LKO of the voltage detector 121 is output, thus securing the reliability of the stored data or the to-be-stored data.

Upon receiving the reset command from the memory controller 110 in a situation where the nonvolatile memory device 120 fails to operate normally, the nonvolatile memory device 120 may perform the reset operation. After performing the reset operation, the nonvolatile memory device 120 may experience power-off and power-on stably, thus operating normally again.

The lock-out status register 122 may store lock-out status information based on whether the lock-out signal LKO is output. In an embodiment, when the power supply voltage VCC decreases to the reference voltage or lower, the lock-out status register 122 may store lock-out status information based on the lock-out signal LKO output from the voltage detector 121. This may enable the memory controller 110 to determine whether the lock-out signal LKO is output, from a value stored in the lock-out status register 122.

In an embodiment, the memory controller 110 may receive status information NSI from the nonvolatile memory device 120. The status information NSI may include information representing whether the program operation is performed normally (e.g., program pass or failure). For example, the nonvolatile memory device 120 may program data in response to a program command received from the memory controller 110. The nonvolatile memory device 120 may transmit the status information NSI to the memory controller 110 based on whether the program operation is performed normally.

Failure of the program operation of the nonvolatile memory device 120 may occur due to various factors. For example, in the case where memory cells to be programmed deteriorate or in the case where the power supply voltage VCC is not supplied normally, the program operation may not be performed normally In this case, the status information NSI provided from the nonvolatile memory device 120 to the memory controller 110 may include information about program failure. Hereinafter, a memory block in which program failure occurs is referred to as a "failure block". That is, the failure block may represent a memory block including memory cells in which data are not programmed normally due to various factors.

In the case where the status information NSI includes the information about the program failure, the memory controller 110 may determine the failure block as one of a bad block or a normal block, based on whether the lock-out signal LKO of the nonvolatile memory device 120 is output. For example, the memory controller 110 may transmit a separate request command to the nonvolatile memory device 120 for the purpose of determining whether the lock-out signal LKO is output. The memory controller 110 may receive lock-out status information stored in the lock-out status register 122 to determine whether the lock-out signal LKO is output. The memory controller 110 may determine the failure block as one of a bad block or a normal block, based on whether the lock-out signal LKO is output.

In the case where the power supply voltage VCC provided to the nonvolatile memory device 120 is abnormal, the lock-out signal LKO may be output. The memory controller 110 may determine whether the lock-out signal LKO is output, to determine whether the power supply voltage VCC is abnormal. In the case where the lock-out signal LKO is output, the memory controller 110 may determine the cause of the failure block as the abnormal power supply voltage VCC, not a defect of a memory cell. Accordingly, the memory controller 110 may reuse the failure block, thus improving the reliability of the nonvolatile memory device 120.

The above-described embodiment is described on the basis of the program operation. However, embodiments of the inventive concept are not limited thereto. The scope and spirit of the inventive concept may be applied to a program operation, a read operation, or an erase operation. Below, for a brief description of the inventive concept, embodiments will be described on the basis of a program operation.

Figure 2:
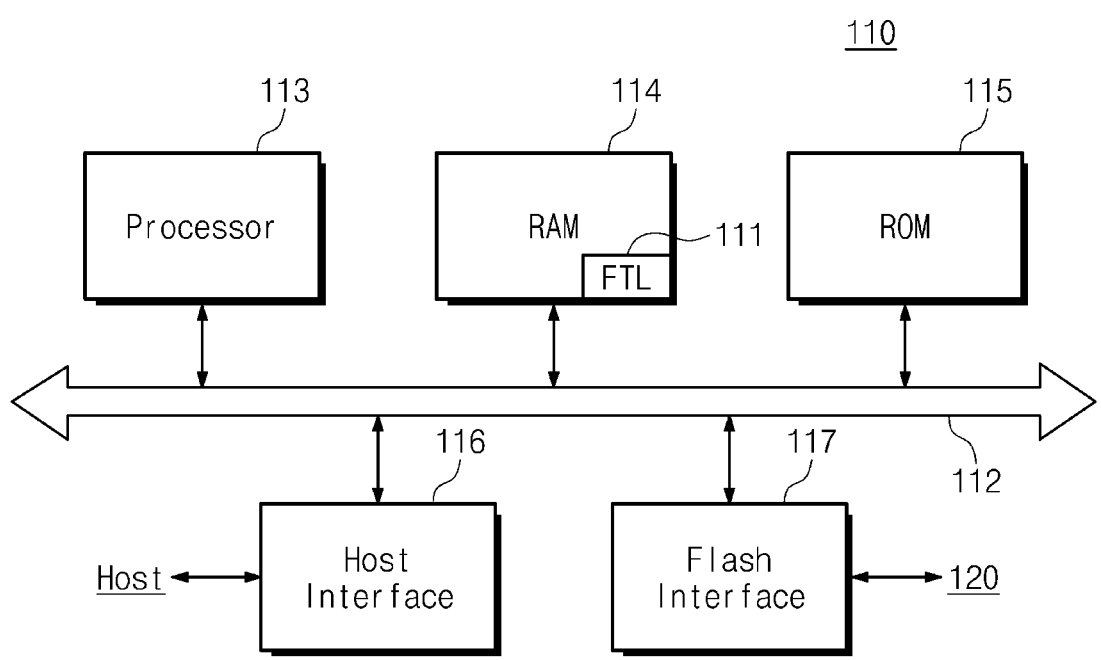
FIG. 2 illustrates a block diagram of a memory controller of FIG. 1.

FIG. 2 illustrates a block diagram of the memory controller 110 of FIG. 1 in detail. For a brief description, only some components of the memory controller 110 are illustrated in FIG. 2. However, the scope and spirit of the inventive concept may not be limited thereto. For example, the memory controller 110 may further include other components such as an error correction code (ECC) circuit.

Referring to FIGS. 1 and 2, the memory controller 110 includes a system bus 112, a processor 113, a random access memory (RAM) 114, a read only memory (ROM) 115, a host interface 116, and a flash interface 117.

The system bus 112 is configured to provide a channel between components of the memory controller 110. The processor 113 may perform and control overall operations of the memory controller 110. The RAM 114 may be used as a buffer memory, a cache memory, or a working memory of the memory controller 110. The RAM 114 may store codes and commands that the processor 113 executes. The RAM 114 may store data processed by the processor 113. The RAM 114 may include for example a static RAM (SRAM).

In an embodiment, the RAM 114 may include a flash translation layer (FTL) 111. The FTL 111 may be a software layer that performs a software operation of the memory controller 110 and may be driven by the processor 113. The FTL 111 may be stored in the RAM 114 and may perform various maintenance operations between a host (not shown) and the nonvolatile memory device 120 such that the nonvolatile memory device 120 is used efficiently. For example, the FTL 111 may perform a translation operation between a logical address and a physical address. The logical address refers to information managed by a file system of a host, and the physical address refers to information representing a physical location of the nonvolatile memory device 120, at which data are stored. The FTL 111 may manage the address translation operation through a mapping table (not illustrated). The FTL 111 may perform a translation operation between a logical address and a physical address to allocate a memory block in which a program operation will be performed.

In an embodiment, the FTL 111 may allocate a memory block, in which a program operation will be performed, from among a plurality of memory blocks included in the nonvolatile memory device 120. In the case where the program operation fails, that is, in the case where the FTL 111 receives the status information NSI, in which information representing program failure is included, from the nonvolatile memory device 120, the FTL 111 may manage the failure block as a bad block if a given condition is satisfied.

For example, in the case where the failure block occurs and the lock-out signal LKO is not output, the FTL 111 may manage the failure block as a bad block. The FTL 111 may manage a memory block corresponding to the failure block as a bad block by using metadata (not illustrated) representing states of the plurality of memory blocks. The FTL 111 may mark a memory block corresponding to a failure block as a bad block and may not allocate the failure block to a memory block for programming data. Accordingly, the FTL 111 may not map a physical address representing a bad block onto a logical address.

Alternatively, in the case where the failure block occurs and the lock-out signal LKO is output, the FTL 111 may manage the failure block as a normal block. The FTL 111 may determine the memory block corresponding to the failure block as a normal block and may reuse the memory block upon performing a program operation later. Accordingly, the FTL 111 may map a physical address representing a normal block onto a logical address.

Metadata representing a state of a memory block may be stored in the RAM 114, and the metadata may be managed by the FTL 111. The metadata may include a bad block table including information about bad blocks. The ROM 115 may store a variety of information needed for the memory controller 110 to operate in the form of firmware.

The memory controller 110 may communicate with the host through the host interface 116. The memory controller 110 may communicate with the nonvolatile memory device 120 through the flash interface 117. In an embodiment, the memory controller 110 may transmit a reset command through the flash interface 117 and may receive, from the nonvolatile memory device 120, the status information NSI in which information representing whether a program operation is performed normally is included. The memory controller 110 may request lock-out status information, which represents whether the lock-out signal LKO is output, through the flash interface 117 and may receive the lock-out status information from the nonvolatile memory device 120.

The memory controller 110 may determine whether to reuse the failure block through the FTL 111, thus improving the reliability of the nonvolatile memory device 120. In the case where the failure block is reused, a storage space of the storage device 100 may be secured, and thus, the number of times that the FTL 111 operates to secure a storage space may decrease. Accordingly, the performance of the storage device 100 may be improved.

Figure 3:
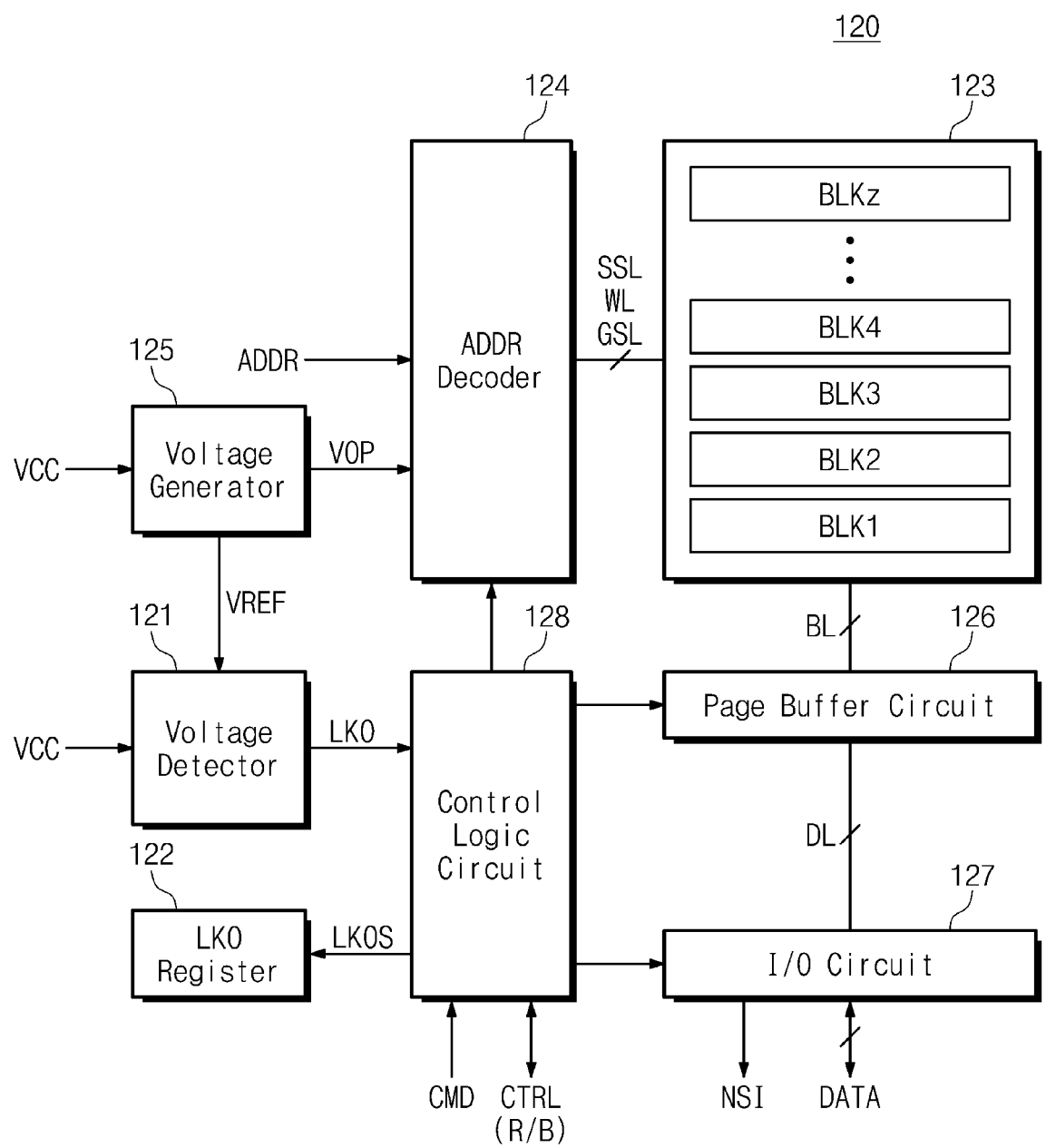
FIG. 3 illustrates a block diagram of a nonvolatile memory device of FIG. 1.

FIG. 3 illustrates a block diagram of the nonvolatile memory device 120 of FIG. 1. Referring to FIGS. 1 and 3, the nonvolatile memory device 120 includes the voltage detector 121, the lock-out status register 122, a memory cell array 123, an address (ADDR) decoder 124, a voltage generator 125, a page buffer circuit 126, an input/output (I/O) circuit 127, and a control logic circuit 128.

The voltage detector 121 may compare the power supply voltage VCC and a reference voltage VREF to output the lock-out signal LKO. The reference voltage VREF may be a voltage that is generated in the voltage generator 125 so as to have a level determined in advance. For example, in the case where the power supply voltage VCC is lower than the reference voltage VREF, the voltage detector 121 may output the lock-out signal LKO. That the power supply voltage VCC is lower than the reference voltage VREF means that the nonvolatile memory device 120 fails to operate normally. In this case, the voltage detector 121 may output the lock-out signal LKO to allow the nonvolatile memory device 120 to perform a recovery operation.

In the case where the power supply voltage VCC is not lower than the reference voltage VREF (in other words, the power supply voltage VCC is higher than or equal to the reference voltage VREF), the voltage detector 121 may not output the lock-out signal LKO. The reason is that the power supply voltage VCC being higher than the reference voltage VREF means that the nonvolatile memory device 120 operates normally. In an embodiment, the reference voltage VREF may be used as a lock-out voltage of the nonvolatile memory device 120.

The lock-out status register 122 may store lock-out status information LKOS. The lock-out status information LKOS represents information about whether the lock-out signal LKO is output from the voltage detector 121. For example, in the case where the lock-out signal LKO is output from the voltage detector 121, the lock-out status register 122 may store the lock-out status information LKOS of a high (e.g., "1") value. In the case where the lock-out signal LKO is not output from the voltage detector 121, the lock-out status register 122 may store the lock-out status information LKOS of a low (e.g., "0") value. Whether the power supply voltage VCC is lower than the reference voltage VREF may be determined from the lock-out status information LKOS stored in the lock-out status register 122.

The above-described value of the lock-out status register 122 is exemplary, and the scope and spirit of the inventive concept is not limited thereto. For instance, in other embodiments the lock-out status information LKOS of a low (e.g., "0") value may indicate the lock-out signal LKO is output from the voltage detector 121, and the lock-out status information LKOS of a high (e.g., "1") value may indicate that the lock-out signal LKO is not output from the voltage detector 121. As illustrated in FIG. 3, the lock-out status register 122 may receive the lock-out status information LKOS from the control logic circuit 128. However, the scope and spirit of the inventive concept is not limited thereto. For example, the lock-out status register 122 may receive the lock-out status information LKOS through another path.

The memory cell array 123 includes a plurality of memory blocks (e.g., BLK1, BLK2, BLK3, BLK4, . . . BLKz), each of which has a plurality of memory cells. The memory cells may be connected with a plurality of word lines WL. Each memory cell may be a single level cell (SLC) storing 1-bit data or a multi-level cell (MLC) storing data of two or more bits.

The address decoder 124 may be connected with the memory cell array 123 through string selection lines SSL, the word lines WL, and ground selection lines GSL. The address decoder 124 may receive an address ADDR from the memory controller 110. The address decoder 124 may receive various operation voltages VOP from the voltage generator 125. The address decoder 124 may decode the received address ADDR and may provide the corresponding operation voltages VOP to the string selection lines SSL, the word lines WL, and the ground selection lines GSL based on the decoded address.

The voltage generator 125 may receive the power supply voltage VCC from the memory controller 110. The voltage generator 125 may generate the various operation voltages required for the nonvolatile memory device 120 to operate by using the received power supply voltage VCC. In an embodiment, the operation voltages VOP may include various levels of voltages such as program voltages, pass voltages, verification voltages, selection read voltages, non-selection read voltages, and erase voltages. The voltage generator 125 may generate the reference voltage VREF and may provide the generated reference voltage VREF to the voltage detector 121. In an embodiment, the reference voltage VREF generated in the voltage generator 125 may have a preset level. Alternatively, although not illustrated in FIG. 2, the reference voltage VREF may be generated in a separate reference voltage generator (not illustrated).

The page buffer circuit 126 may be connected with the memory cell array 123 through bit lines BL. The page buffer circuit 126 may temporarily store data to be programmed or stored in the memory cell array 123 or data read from the memory cell array 123.

The input/output circuit 127 may be connected with the page buffer circuit 126 through data lines DL and may exchange data with the page buffer circuit 126 through the data lines DL. The input/output circuit 127 may exchange data with the memory cell array 110 under control of the control logic circuit 128.

Under control of the control logic circuit 128, the input/output circuit 127 may transmit, to the memory controller 110, the status information NSI including information representing whether a program operation is performed normally. The input/output circuit 127 may transmit the lock-out status information LKOS stored in the lock-out status register 122 to the memory controller 110 under control of the control logic circuit 128. The lock-out status information LKOS may be transmitted to the memory controller 110 along a data line in response to a request of the memory controller 110. Alternatively, the lock-out status information LKOS may be transmitted to the memory controller 110 after being included in the status information NSI. The input/output circuit 127 may transmit data DATA read from the memory cell array 123 to the memory controller 110, and may program data DATA received from the memory controller 110 in the memory cell array 123.

The control logic circuit 128 may control overall operations of the nonvolatile memory device 120. For example, the control logic circuit 128 may control the address decoder 124, the voltage generator 125, the page buffer circuit 126, and the input/output circuit 127 in response to a command CMD and a control signal CTRL received from the memory controller 110.

In an embodiment, the control logic circuit 128 may receive a program command and an address ADDR from the memory controller 110 and may perform a program operation on a memory block corresponding to the received address ADDR. The control logic circuit 128 may transmit the status information NSI including information representing the pass or failure of the program operation to the memory controller 110 through the input/output circuit 127.

In an embodiment, the control logic circuit 128 may transmit the lock-out status information LKOS stored in the lock-out status register 122 to the memory controller 110 through the input/output circuit 127. Also, when receiving a reset command from the memory controller 110, the control logic circuit 128 may perform a reset operation.

Figure 4:
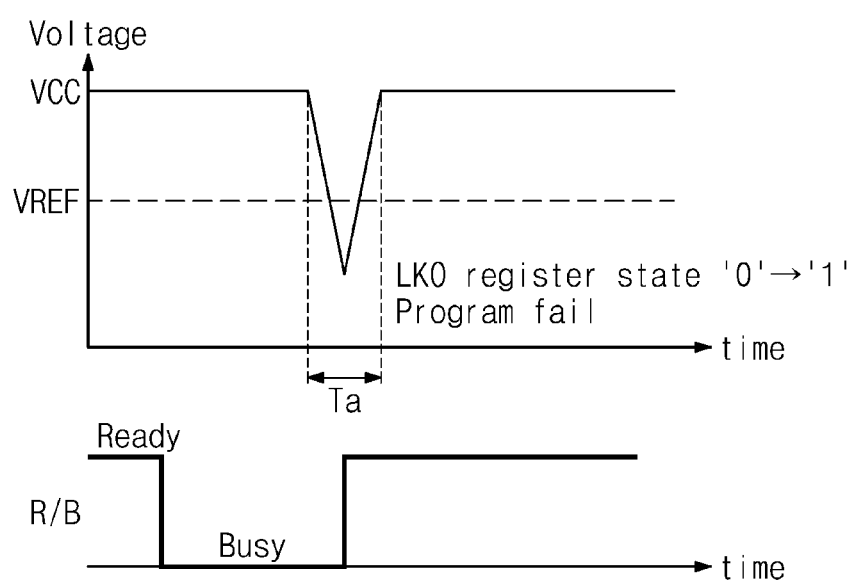
FIG. 4 illustrates a view of an exemplary failure of a program operation of the nonvolatile memory device of FIG. 3.

FIG. 4 illustrates a view of an exemplary failure of a program operation of the nonvolatile memory device 120 of FIG. 3. In FIG. 4, a horizontal axis denotes time, and a vertical axis denotes a voltage magnitude. Referring to FIGS. 3 and 4, the power supply voltage VCC provided to the nonvolatile memory device 120 may become lower than the reference voltage VREF while a program operation is performed. For example, the power supply voltage VCC may be lower than the reference voltage VREF in a specific period Ta. In this case, the voltage detector 121 may detect that the power supply voltage VCC is lower than the reference voltage, to output the lock-out signal LKO. As the lock-out signal LKO is output, the lock-out status register 122 may store the lock-out status information LKOS. As such, a value stored in the lock-out status register 122 may be changed from "0" to "1".

In the case where the lock-out signal LKO is output, the nonvolatile memory device 120 may stop the program operation being performed and may change an operation state of the nonvolatile memory device 120 from a busy state to a ready state. Since the power supply voltage VCC is lower than the reference voltage VREF, the program operation being performed in the nonvolatile memory device 120 may fail. As such, the nonvolatile memory device 120 may transmit the status information NSI in which information representing program failure is included, to the memory controller 110.

Figure 5:
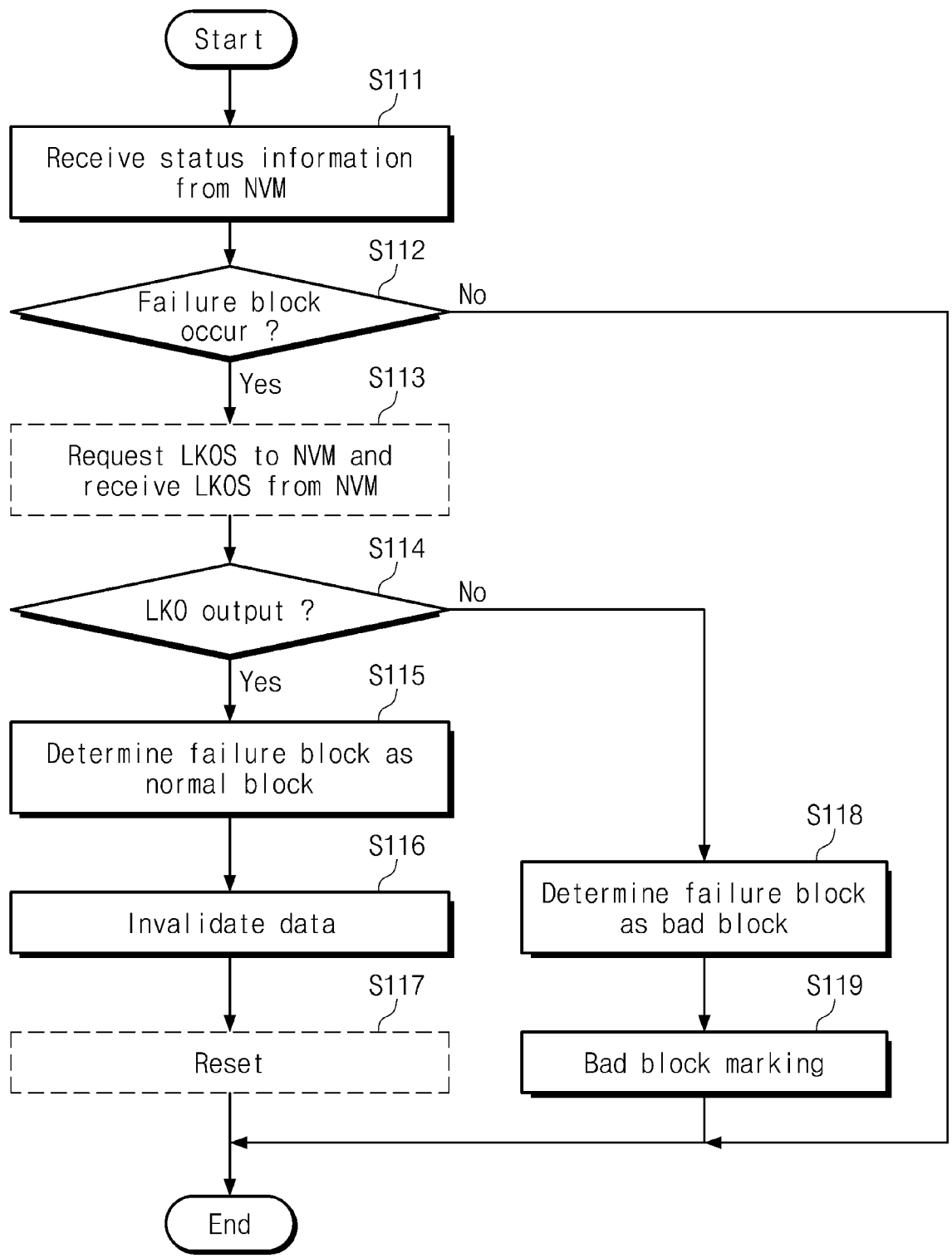
FIG. 5 illustrates a flowchart of an operation of the memory controller of FIG. 1.

FIG. 5 illustrates a flowchart of an operating method of the memory controller 110 of FIG. 1. Referring to FIGS. 1, 2, and 5, in operation S111, the memory controller 110 receives status information NSI from the nonvolatile memory device 120. The status information NSI may include information about pass or failure of a program operation.

In operation S112, the memory controller 110 determines whether a failure block occurs. For example, in the case where the status information NSI includes information about program failure, the memory controller 110 determines that the failure block occurs. Alternatively, in the case where the status information NSI includes information about program pass, the memory controller 110 determines that the failure block does not occur.

If it is determined that the failure block occurs in operation S112 (Yes), in operation S113 the memory controller 110 sends a request for the lock-out status information LKOS to the nonvolatile memory device 120 and receives the lock-out status information LKOS from the nonvolatile memory device 120. If it is determined that a failure block does not occur in operation S112 (No), the operating method ends.

In operation S114, the memory controller 110 determines whether the lock-out signal LKO is output, based on the lock-out status information LKOS. For example, in the case where the lock-out status information LKOS corresponds to a high value, the memory controller 110 determines that the lock-out signal LKO is output. In the case where the lock-out status information LKOS corresponds to a low value, the memory controller 110 determines that the lock-out signal LKO is not output.

If it is determined that the lock-out signal LKO is output in operation S114 (Yes), in operation S115 the memory controller 110 determines a failure block as a normal block. If the failure block is determined as a normal block, the memory controller 110 may reuse the failure block (i.e., the failure block determined as a normal block) upon performing a program operation later. A normal block may be a memory block in which it is determined that a defect does not exist. Memory blocks, which are not determined as bad blocks from among memory blocks included in the nonvolatile memory device 120, may be normal blocks.

In operation S116, the memory controller 110 invalidates data of the memory block in which the program operation is performed (i.e., a failure block determined as a normal block). For example, data stored in the failure block may be different from normal data (i.e., data stored in the case where a program operation does not fail). As such, the memory controller 110 may invalidate data, thereby preventing incorrect data from being used.

In an embodiment, the memory controller 110 may record an invalid mark in a mapping table (not illustrated) such that data programmed are invalidated. Alternatively, the memory controller 110 may not update information about execution of a program operation in the mapping table (not illustrated) such that data are invalidated.

In operation S117, the memory controller 110 performs a reset operation. The memory controller 110 may reset the nonvolatile memory device 120 while performing a reset operation. The memory controller 110 may transmit a reset command (i.e., a reset signal) to the nonvolatile memory device 120 to reset the nonvolatile memory device 120. Trouble in the power supply voltage VCC may be solved as the reset operation of the memory controller 110 and the nonvolatile memory device 120 is performed. In an embodiment, operation S117 may be omitted to prevent a frequent reset operation. As shown, subsequent operation S117 the operating method ends.

If it is determined that the lock-out signal LKO is not output in operation S114 (No), in operation S118 the memory controller 110 determines the failure block as a bad block. In operation S119, the memory controller 110 marks the failure block as a bad block. The memory controller 110 may record information representing that the failure block corresponds to a bad block, in metadata for managing bad blocks. The memory controller 110 may not use the memory block marked as a bad block upon performing a program operation later. The operating method ends subsequent operation S119.

The status information NSI may include the lock-out status information LKOS representing whether the lock-out signal LKO is output, as well as pass or failure information of a program operation. In the case where the status information NSI includes the lock-out status information LKOS, the memory controller 110 would not need to subsequently request the lock-out status information LKOS from the nonvolatile memory device 120. Accordingly, in the case where the status information NSI received in operation S111 includes the lock-out status information LKOS, operation S113 may be omitted.

As described above, according to an embodiment of the inventive concept, even though a program operation fails, the memory controller 110 may not determine the failure block as a bad block if the lock-out signal LKO is output. That is, in the case where a power supply voltage is lower than the reference voltage VREF due to noise occurring in the power supply voltage VCC or an external power supply voltage EVC, the memory controller 110 does not determine failure of a program operation as caused by a defect of a memory block. That is, the corresponding memory block is not deemed defective. Accordingly, the storage device 100 may prevent an actually defect-free memory block from being determined as a bad block and may reuse a failure block that is not defective. This may improve the reliability of memory blocks of the nonvolatile memory device 120.

Figure 6:
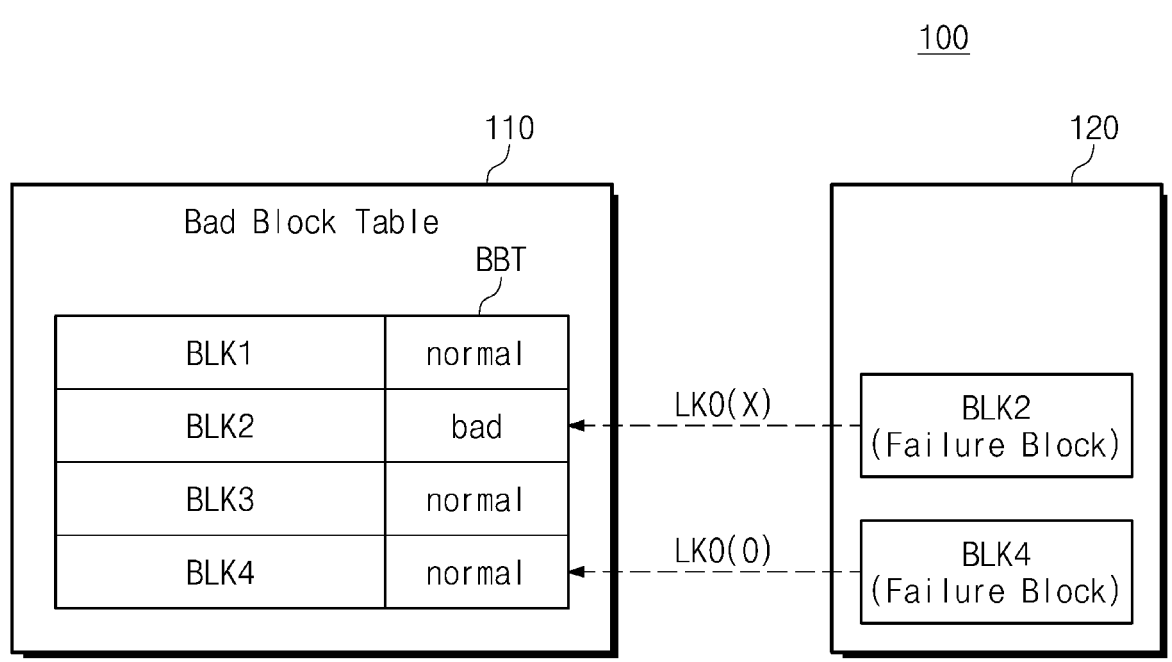
FIG. 6 illustrates a view descriptive of an operation performed according to the flowchart illustrated in FIG. 5.

FIG. 6 illustrates a view descriptive of an operation performed according to the flowchart illustrated in FIG. 5. An exemplary operation in which the memory controller 110 manages a failure block will be described with reference to FIG. 6. For convenience of description, it is assumed that a program operation fails in a second memory block BLK2 and a fourth memory block BLK4 among a plurality of memory blocks of the nonvolatile memory device 120.

Referring to FIG. 6, in the case where a program operation fails in the second memory block BLK2 and the lock-out signal LKO is not output (as indicated by LKO(X)), the memory controller 110 determines the second memory block BLK2 as a bad block. Since the lock-out signal LKO is not output, the failure of the program operation is not because of failure of the power supply voltage VCC, so the memory controller 110 thus determines the second memory block BLK2 as a bad block.

The memory controller 110 may mark a value of a bad block table BBT, which corresponds to the second memory block BLK2, with a "bad" value and may manage the second memory block BLK2 as a bad block. The bad block table BBT may be included in metadata of the memory controller 110. The memory controller 110 may exclude the second memory block BLK2 from allocation of memory blocks upon performing a program operation, based on the bad block table BBT included in the metadata.

In the case where a program operation fails in the fourth memory block BLK4 and the lock-out signal LKO is output (as indicated by LKO(O)), the memory controller 110 determines the fourth memory block BLK4 as a normal block. Since the lock-out signal LKO is output, the failure of the program operation is not because of a defect of the memory block but is because of failure of the power supply voltage VCC, so the memory controller 110 thus determines the fourth memory block BLK4 as a normal block.

The memory controller 110 may maintain a value of a bad block table BBT, which corresponds to the fourth memory block BLK4, with a "normal" value and may allocate the fourth memory block BLK4 upon performing a program operation.

The method in which the memory controller 110 of the inventive concept manages a failure block is not limited to the flowchart of FIG. 6, and any method of marking block information by using metadata as illustrated in FIG. 6 may be included in the scope and spirit of the inventive concept.

Figure 7:
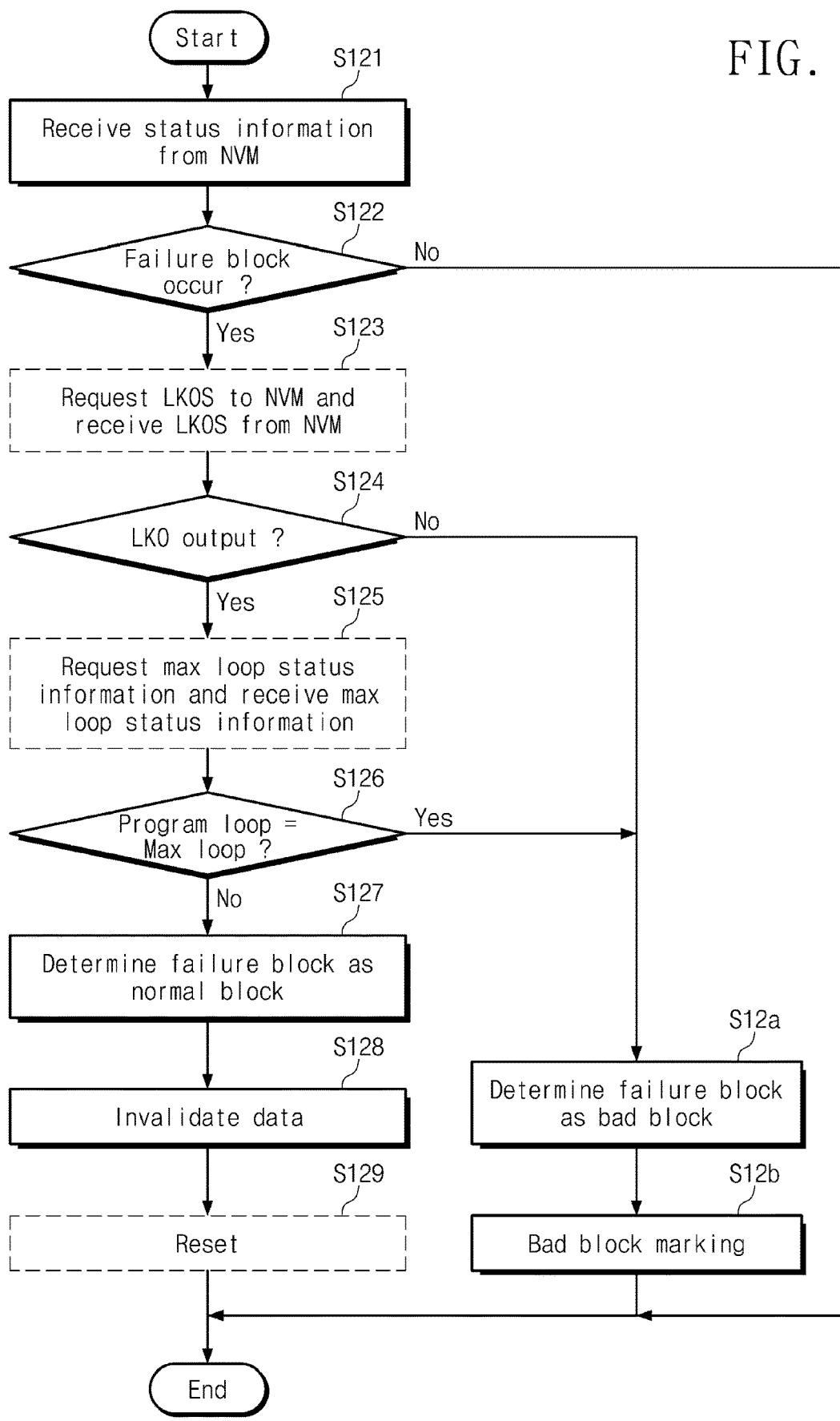
FIG. 7 illustrates a flowchart of an operating method of the memory controller of FIG. 1.

FIG. 7 illustrates a flowchart of an operating method of the memory controller 110 of FIG. 1. Referring to FIGS. 1 and 7, the memory controller 110 performs operation S121 to operation S124. Operation S121 to operation S124 are similar to operation S111 to operation S114 of FIG. 5, and thus detailed description of operation S121 to operation S124 is omitted.

In the case where the lock-out signal LKO is output in operation S124 (Yes), in operation S125 the memory controller 110 requests the nonvolatile memory device 120 to send the maximum loop status information, and then receives the maximum loop status information from the nonvolatile memory device 120. The maximum loop status information refers to information representing whether an operation loop of a program operation of the nonvolatile memory device 120 reaches the maximum loop count.

For example, in the case where a program loop corresponds to the maximum loop state (i.e., the program loop reaches the maximum loop count), the maximum loop status information may be "1". In the case where a program loop does not correspond to the maximum loop state (i.e., the program loop does not reach the maximum loop count), the maximum loop status information may be "0".

In operation S126, the memory controller 110 determines whether a program loop count associated with a failure block reaches the maximum loop count. In an embodiment, a program loop may be repeatedly performed upon performing a program operation in an incremental step program pulse (ISPP) manner. The number of program loops to be performed during a program operation may be determined in advance. In the case where a program operation fails even though a program loop reaches the maximum loop, memory cells included in a failure block may be at a deterioration state.

If a program loop at which program failure occurs is determined to not be the maximum loop in operation S126 (NO), in operation S127 the memory controller 110 determines the failure block as a normal block. If the failure block is determined as a normal block, the memory controller 110 may reuse the failure block upon performing a program operation later.

In operation S128, the memory controller 110 invalidates data experiencing a program operation in the corresponding failure block determined as a normal block. In operation S129, the memory controller 110 performs a reset operation. Operation S128 and operation S129 are similar to operation S116 and operation S117 of FIG. 5, and thus detailed description of operations S128 and S129 is omitted.

In the case it is determined by the memory controller 110 that the lock-out signal LKO is not output in operation S124 (No) or that a program loop performed in the failure block is the maximum loop in operation S126 (Yes), the memory controller 110 performs operation S12*a* and operation S12*b*. Operation S12*a* and operation S12*b* are similar to operation S118 and operation S119 of FIG. 5, and thus detailed description of operations S12*a* and S12*b* are omitted.

The status information NSI may include the maximum loop status information. In this case, the memory controller 110 would not need to request the maximum loop status information from the nonvolatile memory device 120. That is, operation S125 may be omitted. The memory controller 110 may determine whether a program loop associated with the failure block is the maximum loop, from the status information NSI received in operation S121.

As described above, in the case where a program operation fails, the memory controller 110 does not determine the failure block as a bad block immediately. Even though a program operation fails, the memory controller 110 does not determine the failure block as a bad block if the lock-out signal LKO is output and a program loop is not the maximum loop. In the case where a program loop is the maximum loop even though the lock-out signal LKO is output, the memory controller 110 determines the failure block as a bad block. That is, if the probability that a memory cell deteriorates regardless of whether the failure of the power supply voltage VCC occurs is high, the memory controller 110 may determine that the failure of the program operation is because of a defect of the memory block. Accordingly, the storage device 100 may prevent an actually defective memory block from being determined as a normal block. This may improve the reliability of memory blocks of the nonvolatile memory device 120.

Figure 8:
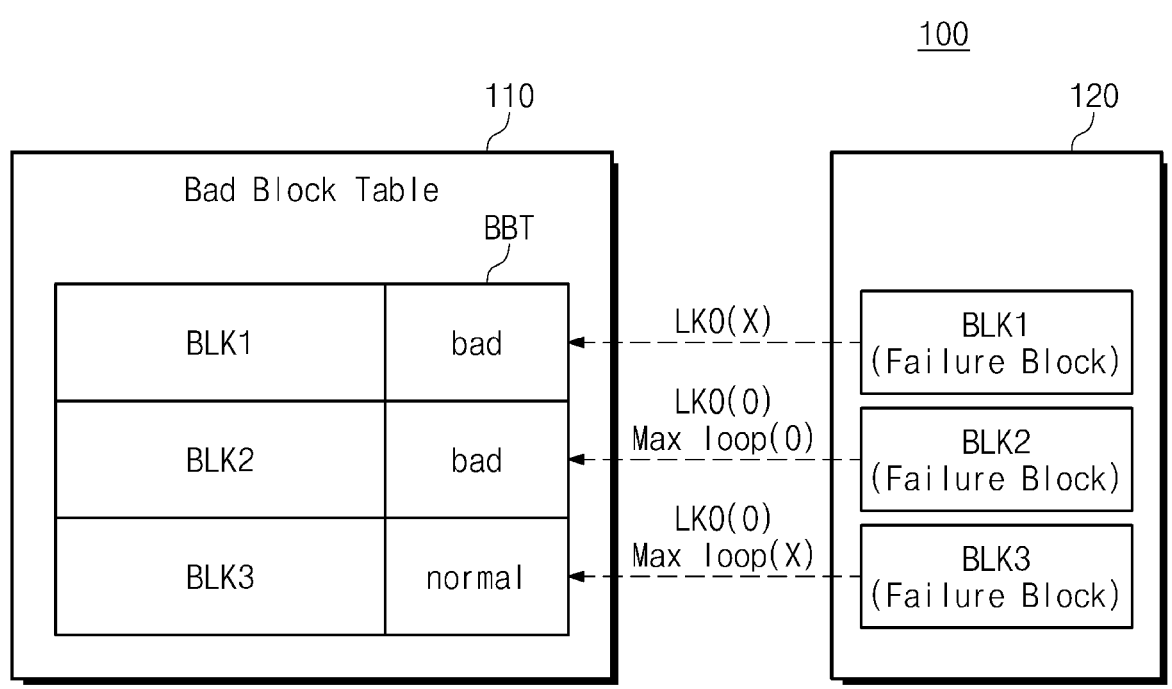
FIG. 8 illustrates a view descriptive of an operating method according to the flowchart of FIG. 7.

FIG. 8 illustrates a view descriptive of an operating method according to the flowchart of FIG. 7. An exemplary operation in which the memory controller 110 manages a failure block will be described with reference to FIG. 8. For convenience of description, it is assumed that a program operation fails in first to third memory blocks BLK1 to BLK3 among a plurality of memory blocks of the nonvolatile memory device 120.

Referring to FIG. 8, in the case where the lock-out signal LKO is not output with regard to the first memory block BLK1 (as indicated by LKO(X)), the memory controller 110 determines the first memory block BLK1 as a bad block. The memory controller 110 may mark a value corresponding to the first memory block BLK1 with a "bad" value in the bad block table BBT and may manage the first memory block BLK1 as a bad block.

In the case where the lock-out signal LKO is output with regard to the second memory block BLK2 (as indicated by LKO(O)) and a program loop is the maximum loop (as indicated by Max loop (O)), the memory controller 110 determines the second memory block BLK2 as a bad block. The second memory block BLK2 is determined a bad block because a program loop is the maximum loop even though the lock-out signal LKO is output. The memory controller 110 may mark a value corresponding to the second memory block BLK2 with a "bad" value in the bad block table BBT and may manage the second memory block BLK2 as a bad block.

In the case where the lock-out signal LKO is output with regard to the third memory block BLK3 (as indicated by LKO(O)) and a program loop is not the maximum loop (as indicated by Max loop (X), the memory controller 110 determines the third memory block BLK3 as a normal block. The memory controller 110 may maintain a value corresponding to the third memory block BLK3 with a "normal" value in the bad block table BBT and may manage the third memory block BLK3 as a normal block.

Figure 9:
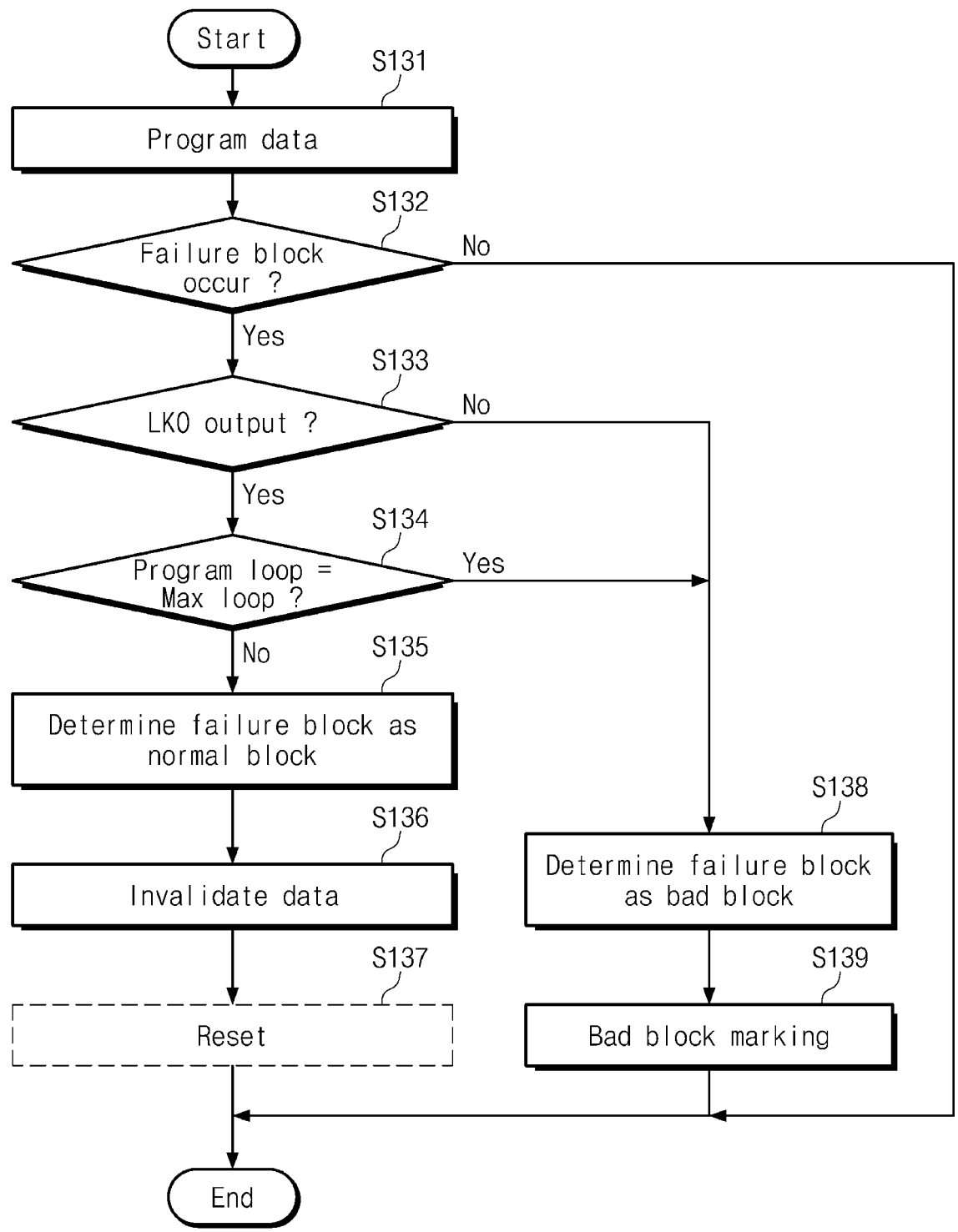
FIG. 9 illustrates a flowchart of an operating method of the storage device of FIG. 1.

FIG. 9 illustrates a flowchart of an operating method of the storage device 100 of FIG. 1. Referring to FIGS. 1 and 9, in operation S131, the storage device 100 performs a program operation on data. In an embodiment, the storage device 100 may perform a program operation in response to a program signal received from the outside. The storage device 100 performs operation S132 to operation S139. Operation S132 to operation S139 are respectively similar to operations S122, S124, S126, S127, S128, S129, S12a and S12b of FIG. 7. Operation S122 to operation S12b of FIG. 7 are described as being performed in the memory controller 110. However, since the memory controller 110 is included in the storage device 100, the storage device 100 may be characterized as performing operation S122 to operation S12b. Accordingly, detailed description of operation S132 to operation S139 of FIG. 9 is omitted.

Figure 10:
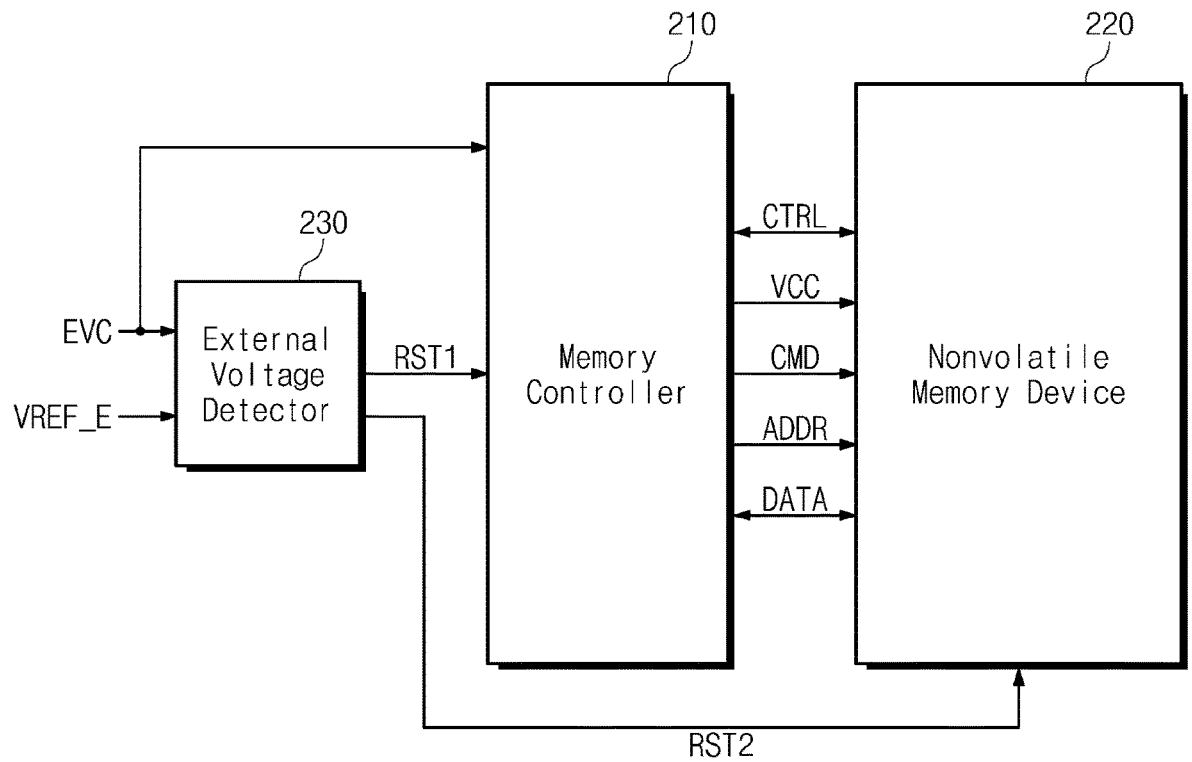
FIG. 10 illustrates a block diagram of a storage device according to an embodiment of the inventive concept.

FIG. 10 illustrates a block diagram of a storage device 200 according to an embodiment of the inventive concept. Referring to FIG. 10, the storage device 200 includes a memory controller 210, a nonvolatile memory device 220, and an external voltage detector 230. The memory controller 210 and the nonvolatile memory device 220 in FIG. 10 are similar to the memory controller 110 and the nonvolatile memory device 120 described with reference to FIG. 1, and thus detailed description of similar features and operations will be omitted and the following description may focus on how the embodiment of FIG. 10 is different from the embodiment of FIG. 1. In addition to including memory controller 210 and nonvolatile memory device 220, the storage device 200 further includes the external voltage detector 230. The external voltage detector 230 detects whether the external power supply voltage EVC provided from the outside is lower than an external reference voltage VREF_E. In an embodiment, in the case where the external power supply voltage EVC is lower than the external reference voltage VREF_E, the external voltage detector 230 outputs first and second reset signals RST1 and RST2. The first reset signal RST1 is transmitted to the memory controller 210, and the second reset signal RST2 is transmitted to the nonvolatile memory device 220. The external voltage detector 230 may be included in an internal power supply complement (e.g., a power management integrated circuit (PMIC)). Alternatively, the external voltage detector 230 may exist independently of the internal power supply component.

The memory controller 210 performs a reset operation in response to the first reset signal RST1, and the nonvolatile memory device 220 performs a reset operation in response to the second reset signal RST2. In an embodiment, the second reset signal RST2 may be transmitted from the external voltage detector 230 to the nonvolatile memory device 220 after a given time with respect to an output time point of the first reset signal RST1. As such, the memory controller 210 may perform the reset operation, and the nonvolatile memory device 220 may perform the reset operation after a time elapses. Alternatively, the first reset signal RST1 and the second reset signal RST2 may be output at the same time.

The nonvolatile memory device 220 performs the reset operation in response to the second reset signal RST2, and the reset operation may include a recovery operation. In an embodiment, the nonvolatile memory device 220 may stop an operation and may enter a stable operation standby state. After performing the reset operation, the nonvolatile memory device 120 may experience power-off and power-on operations stably, thus operating normally again.

Figure 11:
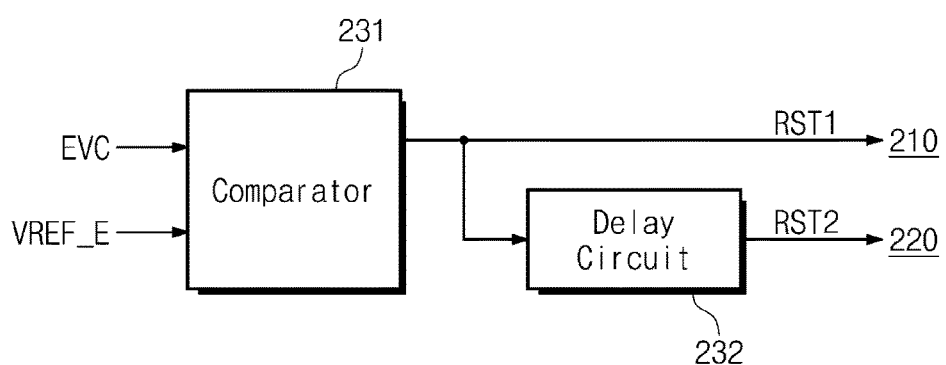
FIG. 11 illustrates a block diagram of an external voltage detector of FIG. 10.

FIG. 11 illustrates a block diagram of the external voltage detector 230 of FIG. 10. Referring to FIGS. 10 and 11, the external voltage detector 230 may include a comparator 231 and a delay circuit 232. The comparator 231 compares the magnitude of the external power supply voltage EVC and the magnitude of the external reference voltage VREF_E. In the case where the external power supply voltage EVC is lower than the external reference voltage VREF_E, the comparator 231 outputs the first reset signal RST1. The delay circuit 232 delays the first reset signal RST1 for a preset time to output the second reset signal RST2. Alternatively, the delay circuit 232 may output the second reset signal RST2 immediately without delaying the first reset signal RST1. The first reset signal RST1 is transmitted to the memory controller 210, and the second reset signal RST2 is transmitted to the nonvolatile memory device 220.

Figure 12:
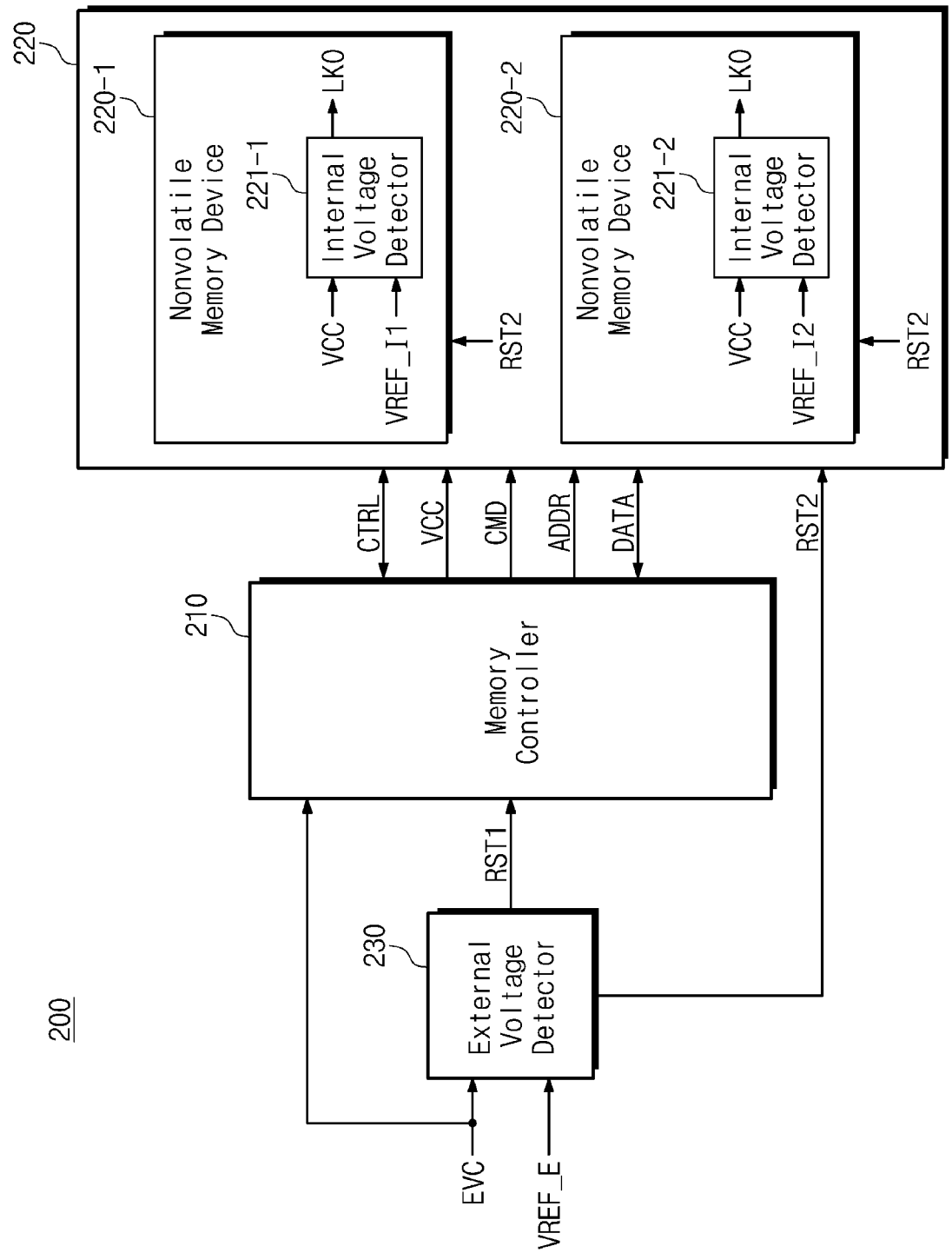
FIG. 12 illustrates a block diagram of an exemplification in which the storage device of FIG. 10 includes a plurality of nonvolatile memory devices.

FIG. 12 illustrates a block diagram of an exemplification in which the storage device 200 of FIG. 10 includes a plurality of nonvolatile memory devices. Referring to FIG. 12, the storage device 200 includes the memory controller 210, the nonvolatile memory device 220, and the external voltage detector 230. The nonvolatile memory device 220 includes a plurality of nonvolatile memory devices. In an embodiment, the nonvolatile memory device 220 may include first and second nonvolatile memory devices 220-1 and 220-2. For example, each of the first and second nonvolatile memory devices 220-1 and 220-2 may be implemented as or with one package or one chip. The memory controller 210 and the external voltage detector 230 are substantially the same as the memory controller 210 and the external voltage detector 230 of FIG. 10, and thus detailed description thereof is omitted.

Each of the first and second nonvolatile memory devices 220-1 and 220-2 performs a reset operation in response to the second reset signal RST2 from the external voltage detector 230. Accordingly, the first and second nonvolatile memory devices 220-1 and 220-2 perform the reset operations at the same time.

The first nonvolatile memory device 220-1 includes a first internal voltage detector 221-1, and the second nonvolatile memory device 220-2 includes a second internal voltage detector 221-2. Since the first and second nonvolatile memory devices 220-1 and 220-2 perform the same operations, operations of the first and second nonvolatile memory devices 220-1 and 220-2 will be described on the basis of the first nonvolatile memory device 220-1.

In the case where the power supply voltage VCC provided from the memory controller 210 is lower than a first internal reference voltage VREF_I1, the first internal voltage detector 221-1 outputs the lock-out signal LKO. In an embodiment, in the case where the external power supply voltage EVC is abnormal, the first and second reset signals RST1 and RST2 are output from the external voltage detector 230. Also, in the case where the power supply voltage VCC is abnormal due to the abnormal external power supply voltage EVC, the first internal voltage detector 221-1 outputs the lock-out signal LKO.

The first internal voltage detector 221-1 may operate independently of an operation of the external voltage detector 230. For example, even though the external power supply voltage EVC is supplied normally, and thus, the external voltage detector 230 does not output the first and second reset signals RST1 and RST2, the first internal voltage detector 221-1 may output the lock-out signal LKO if the power supply voltage VCC is lower than the first internal reference voltage VREF_I1.

According to the assumption that the magnitude of the external power supply voltage EVC is the same as the magnitude of the power supply voltage VCC, the external reference voltage VREF_E may be higher than (i.e., greater than) the first internal reference voltage VREF_I1. As such, the external voltage detector 230 may detect whether the external power supply voltage EVC is abnormal prior to the first internal voltage detector 221-1 detecting that the power supply voltage VCC is abnormal, and the nonvolatile memory device 220 may receive the second reset signal RST2 before the lock-out signal LKO is output. The nonvolatile memory device 220 may perform a recovery operation in response to receiving the second reset signal RST2. In this case, even though the lock-out signal LKO is output, the nonvolatile memory device 220 may not perform the recovery operation separately with regard to the output of the lock-out signal LKO. Accordingly, in the case where both the second reset signal RST2 and the lock-out signal LKO are output, the nonvolatile memory device 220 may perform the recovery operation corresponding to only the second reset signal RST2 without duplicated execution.

The first internal voltage detector 221-1 outputs the lock-out signal LKO on the basis of the first internal reference voltage VREF_I1, and the second internal voltage detector 221-2 outputs the lock-out signal LKO on the basis of the second internal reference voltage VREF_I2. Even though the first internal reference voltage VREF_I1 and the second internal reference voltage VREF_I2 are set to have the same magnitude, a difference may occur between the first internal reference voltage VREF_I1 and the second internal reference voltage VREF_I2 due to various physical factors of elements constituting corresponding circuits. In the case where the magnitude of the first internal reference voltage VREF_I1 is different from the magnitude of the second internal reference voltage VREF_I2, the lock-out signals LKO may be output from the first and second internal voltage detectors 221-1 and 221-2 at different times with respect to the same power supply voltage VCC. In an embodiment, the output times of the lock-out signals LKO from the first and second internal voltage detectors 221-1 and 221-2 may be different from each other. In the case where the output times of the lock-out signals LKO are different from each other and a recovery operation corresponding to the second reset signal RST2 is not performed, the first and second nonvolatile memory devices 220-1 and 220-2 may perform recovery operations at different times.

Also, the lock-out signals LKO may be output from any one of the first and second internal voltage detectors 221-1 and 221-2 due to a difference between magnitudes of the first and second internal reference voltages VREF_I1 and VREF_I2. As such, any one of the first and second nonvolatile memory devices 220-1 and 220-2 may perform the recovery operation. In the case where the plurality of nonvolatile memory devices 220-1 and 220-2 do not perform the recovery operations at the same time, the reliability of the nonvolatile memory device 220 may decrease.

The external voltage detector 230 may transmit the second reset signal RST2 to the first and second nonvolatile memory devices 220-1 and 220-2 at the same time. As such, the first and second nonvolatile memory devices 220-1 and 220-2 may perform the reset operations at the same time, and thus, the reliability of the nonvolatile memory device 220 may be improved.

Figure 13:
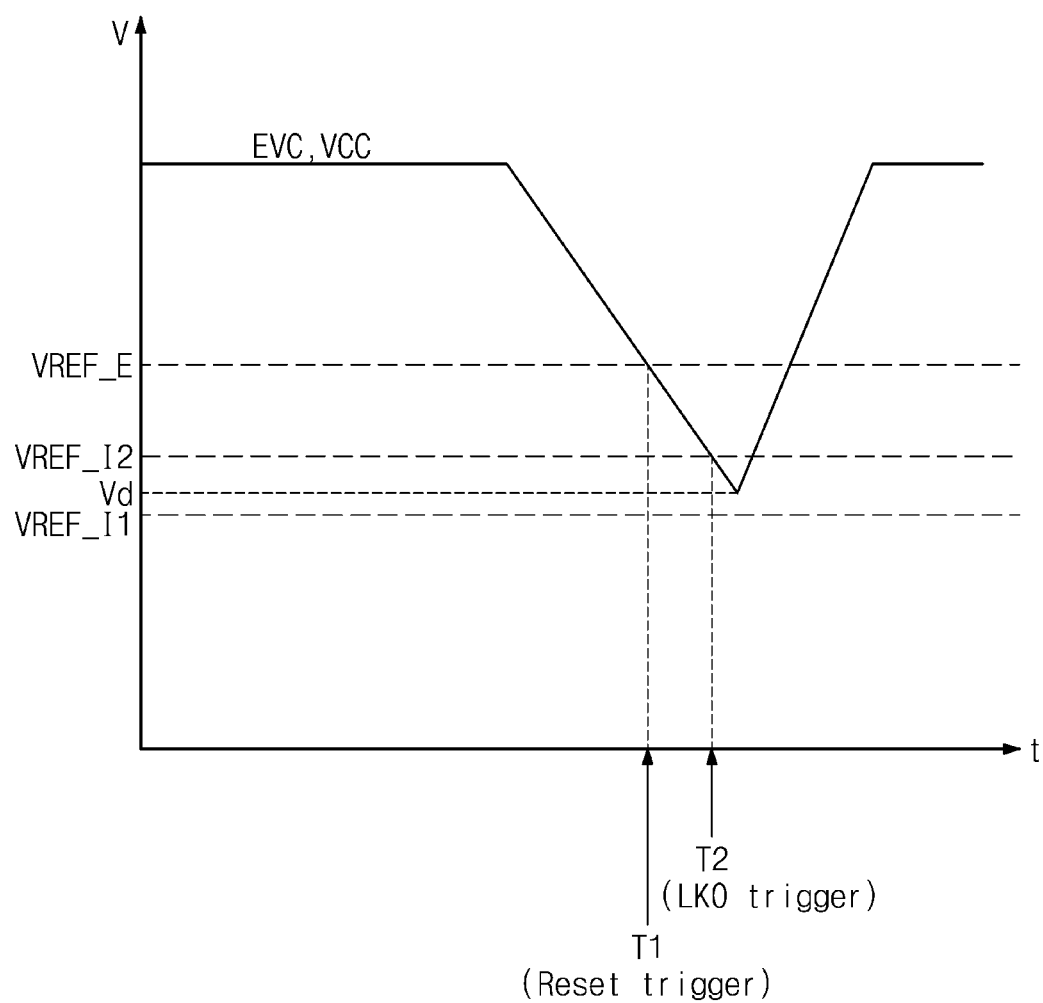
FIG. 13 illustrates a view descriptive of a reset operation of the storage device of FIG. 12.

FIG. 13 illustrates a view descriptive of a reset operation of the storage device 200 of FIG. 12. In FIG. 13, a horizontal axis denotes a time "t", and a vertical axis denotes a voltage magnitude "V". For convenience of description, it is assumed that the external power supply voltage EVC and the power supply voltage VCC have the same magnitude. As illustrated in FIG. 13, the external power supply voltage EVC and the power supply voltage VCC may be maintained at a given magnitude, may decrease to the magnitude of a specific voltage Vd, and may increase again.

Assuming that the external voltage detector 230 does not exist, in the case where the power supply voltage VCC decreases to the specific voltage Vd between the first internal reference voltage VREF_I1 and the second internal reference voltage VREF_I2, the first internal voltage detector 221-1 does not output the lock-out signal LKO. In this case, only the second internal voltage detector 221-2 outputs the lock-out signal LKO at a second time point T2. As such, only the second nonvolatile memory device 220-2 of the first and second nonvolatile memory devices 220-1 and 220-2 performs a recovery operation associated with the lock-out signal LKO. Since the first nonvolatile memory device 220-1 does not perform a recovery operation when the power supply voltage VCC is abnormal, the reliability of the storage device 200 may decrease.

The external voltage detector 230 however compares the magnitude of the external power supply voltage EVC and the magnitude of the external reference voltage VREF_E. The first internal voltage detector 221-1 compares the magnitude of the power supply voltage VCC and the magnitude of the first internal reference voltage VREF_I1. The second internal voltage detector 221-2 compares the magnitude of the power supply voltage VCC and the magnitude of the second internal reference voltage VREF_I2. The magnitude of the external reference voltage VREF_E is greater than the magnitudes of the first and second internal reference voltages VREF_I1 and VREF_I2, and the magnitude of the first internal reference voltage VREF_I1 may be smaller than the magnitude of the second internal reference voltage VREF_I2. The external voltage detector 230 may therefore detect the abnormal external power supply voltage EVC before the first and second internal voltage detectors 220-1 and 220-2 detect the abnormal power supply voltage VCC. The external voltage detector 230 detects the abnormal external power supply voltage EVC at a first time point T1 and transmits the second reset signal RST2 to the first and second nonvolatile memory devices 220-1 and 220-2. Accordingly, the first and second nonvolatile memory devices 220-1 and 220-2 may simultaneously perform the reset operation in response to the second reset signal RST2. Accordingly, the reliability of the storage device 200 may be improved by using the external voltage detector 230.

The storage device 200 according to an embodiment of the inventive concept is not limited to the exemplification illustrated in FIGS. 12 and 13. For example, the storage device 200 in which each of a plurality of nonvolatile memory devices 220 includes the internal voltage detector 221-1/221-2 may be included in the scope and spirit of the inventive concept.

Figure 14:
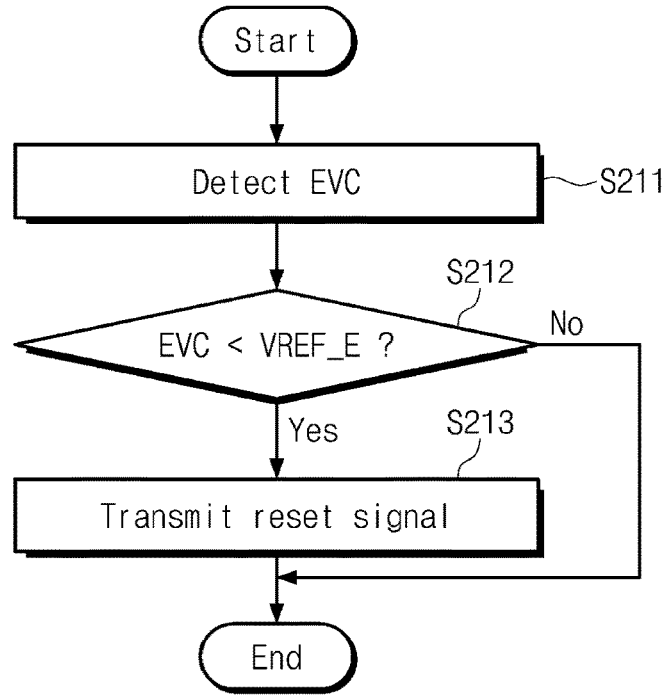
FIG. 14 illustrates a flowchart of an operating method of the storage device of FIG. 10.

FIG. 14 illustrates a flowchart of an operating method of the storage device 200 of FIG. 10. Referring to FIGS. 10 and 14, in operation S211, the external voltage detector 230 detects the external power supply voltage EVC. In operation S212, the external voltage detector 230 compares the external power supply voltage EVC and the external reference voltage VREF_E. If the external power supply voltage EVC is lower than the external reference voltage VREF_E in operation S212 (Yes), in operation S213 the external voltage detector 230 outputs the first and second reset signals RST1 and RST2 so as to be transmitted to the memory controller 210 and the nonvolatile memory device 220. In the case where the external power supply voltage EVC is not lower than the external reference voltage VREF_E in operation S212 (No), the external voltage detector 230 does not output the first and second reset signals RST1 and RST2 and the operating method subsequently ends.

Figure 15:
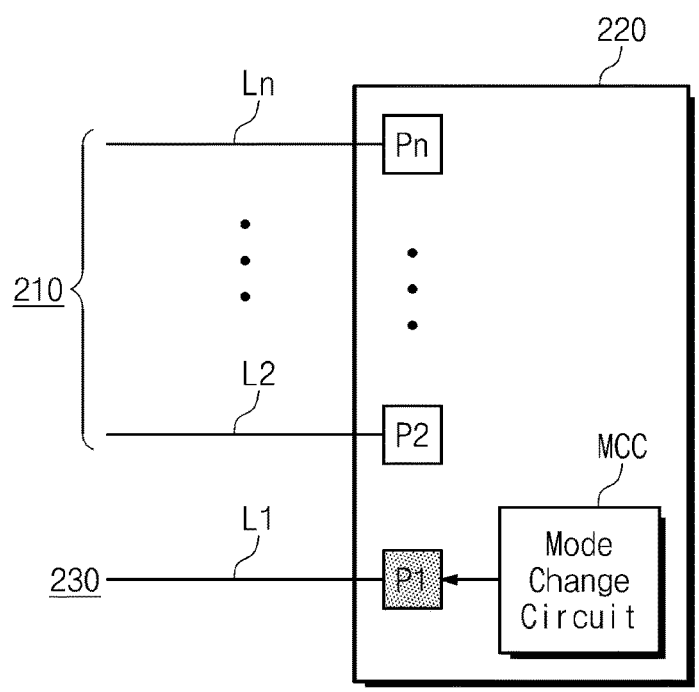
FIG. 15 illustrates a view of how a mode of a pad of the nonvolatile memory device is changed.

FIG. 15 illustrates a view of how a mode of a pad of the nonvolatile memory device 220 is changed. Referring to FIG. 15, a mode of a pad for receiving the second reset signal RST2 may be changed. Referring to FIGS. 10 and 15, the nonvolatile memory device 220 includes a plurality of pads P1 to Pn to receive various signals from the memory controller 210 (not shown). The pads P1, P2 to Pn may receive signals transmitted to the nonvolatile memory device 220 through signal lines L1, L2, ... , Ln connected to the pads P1 to Pn, respectively. Different kinds of signals may be transmitted to the nonvolatile memory device 220 through different pads P1 to Pn. The nonvolatile memory device 220 may perform operations corresponding to the signals received through the pads P1 to Pn.

The nonvolatile memory device 220 may not include a pad for receiving the second reset signal RST2. As such, the memory controller 210 may change a mode of any one of the pads P1 to Pn to allow the nonvolatile memory device 220 to receive the second reset signal RST2. In an embodiment, the memory controller 210 may change a mode of one pad among the plurality of pads P1 to Pn through a mode change circuit MCC. The mode-changed pad may be a pad supporting a multi-mode.

For example, the memory controller 210 may change a mode of the first pad P1 to a mode for receiving the second reset signal RST2 from the external voltage detector 230 (not shown). The second reset signal RST2 may be input to the first pad P1 through the first signal line L1 connected with the first pad P1. In the case where the second reset signal RST2 is received through the first pad P1, the nonvolatile memory device 220 may perform a reset operation.

Accordingly, the storage device 200 according to an embodiment of the inventive concept may perform the reset operation in response to the second reset signal RST2 without changing hardware of the nonvolatile memory device 220. A way to change a mode of a pad, according to an embodiment of the inventive concept, is not limited to the example of FIG. 15. For example, the inventive concept may change a mode of a pad by using a circuit, a configuration, a device, and/or software, capable of changing a mode of the pads P1 to Pn.

Figure 16:
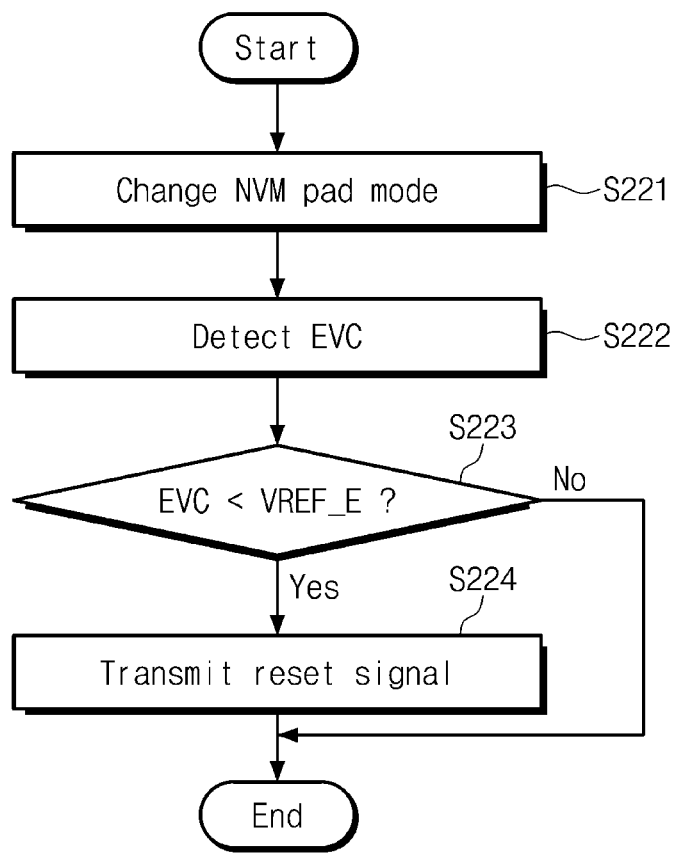
FIG. 16 illustrates a flowchart of an operating method of the storage device of FIG. 10.

FIG. 16 illustrates a flowchart of an operating method of the storage device 200 of FIG. 10. Referring to FIGS. 10 and 16, in step S221, the memory controller 210 changes a mode of one pad included in the nonvolatile memory device 220. The memory controller 210 may change a mode of a pad, which supports a multi-mode, from among a plurality of pads included in the nonvolatile memory device 220 to a mode for receiving the second reset signal RST2. In an embodiment, the memory controller 210 may change the mode of the pad to the mode for receiving the second reset signal RST2 immediately after the storage device 200 is powered on. Accordingly, the memory controller 210 may allow the nonvolatile memory device 220 to receive the second reset signal RST2 from the external voltage detector 230.

The external voltage detector 230 may perform operation S222 through operation S224. Operation S222 through operation S224 are similar to operation S211 through operation S213 of FIG. 14, and thus detailed description of operations S222, S223 and S224 are omitted.

Figure 17:
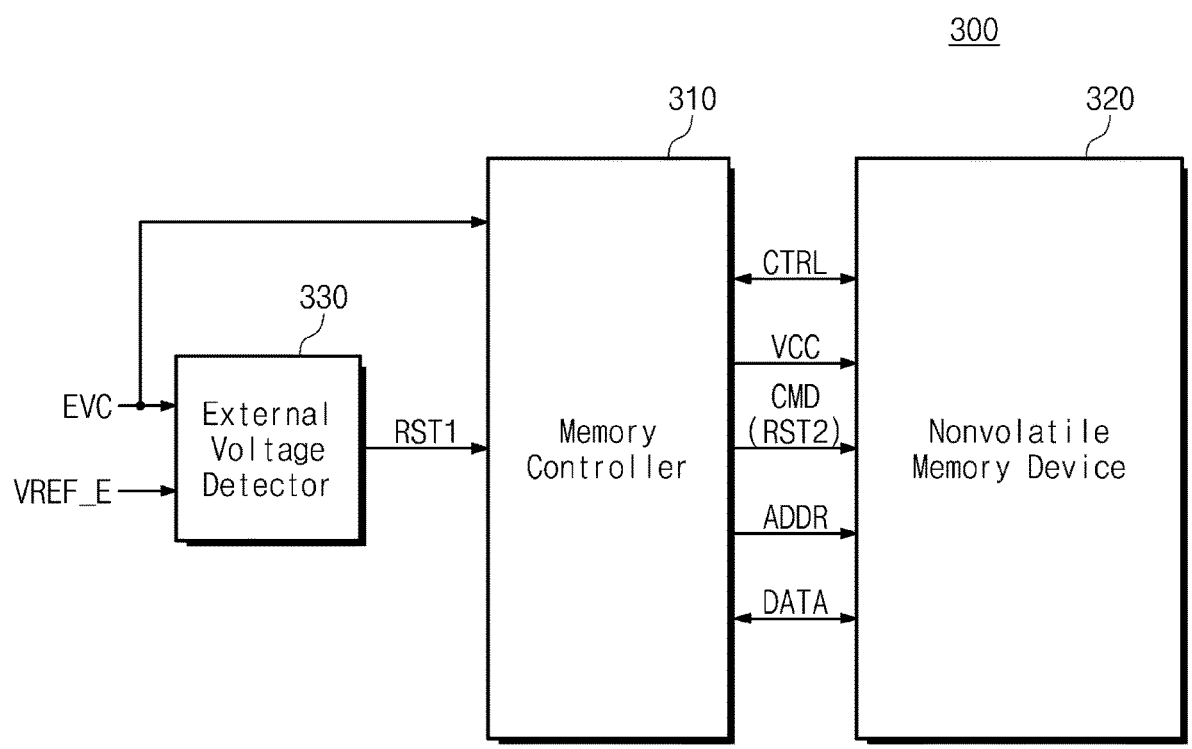
FIG. 17 illustrates a block diagram of a storage device according to an embodiment of the inventive concept.

FIG. 17 illustrates a block diagram of a storage device 300 according to an embodiment of the inventive concept. Referring to FIG. 17, the storage device 300 includes a memory controller 310, a nonvolatile memory device 320, and an external voltage detector 330. The memory controller 310, the nonvolatile memory device 320, and the external voltage detector 330 are similar to the memory controller 210, the nonvolatile memory device 220, and the external voltage detector 230 of FIG. 10. Thus, detailed description of similar features and operations of the memory controller 310, the nonvolatile memory device 320, and the external voltage detector 330 will be omitted and the following description may focus on how the embodiment of FIG. 17 is different from the embodiment of FIG. 10.

In the case where the external power supply voltage EVC is lower than the external reference voltage VREF_E, the external voltage detector 330 outputs the first reset signal RST1 to the memory controller 310. The memory controller 310 receives the first reset signal RST1 and performs a reset operation, and transmits the second reset signal RST2 to the nonvolatile memory device 320. The nonvolatile memory device 320 receives the second reset signal RST2 and performs the reset operation. As such, after the memory controller 310 performs the reset operation, the nonvolatile memory device 320 performs the reset operation.

In the case where the memory controller 310 directly transmits the second reset signal RST2 to the nonvolatile memory device 320 as in the embodiment of FIG. 17 instead of the external voltage detector 330 transmitting the second reset signal RST2 to the nonvolatile memory device 320 as in the embodiment of FIG. 10, the memory controller 310 transmits the second reset signal RST2 to the nonvolatile memory device 320 after receiving the first reset signal RST1. In this case, since the nonvolatile memory device 320 receives the second reset signal RST2 after a given time on the basis of a time when the memory controller 310 receives the first reset signal RST1, the external voltage detector 330 may not include a separate delay circuit.

As described above, the storage devices 200 and 300 according to embodiments of the inventive concept described with respect to FIGS. 10 and 17 respectively include the external voltage detectors 230 and 330 therein. However, a storage device according to embodiments of the inventive concept is not limited thereto. For example, an external voltage detector may be disposed outside of the storage device. Also, the external voltage detector according to an embodiment of the inventive concept may be disposed inside as the memory controller. That is, a location of the external voltage detector according to an embodiment of the inventive concept is not limited to the above-described exemplifications, and the external voltage detector may be disposed at any location capable of detecting external power supply voltage EVC.

Figure 18:
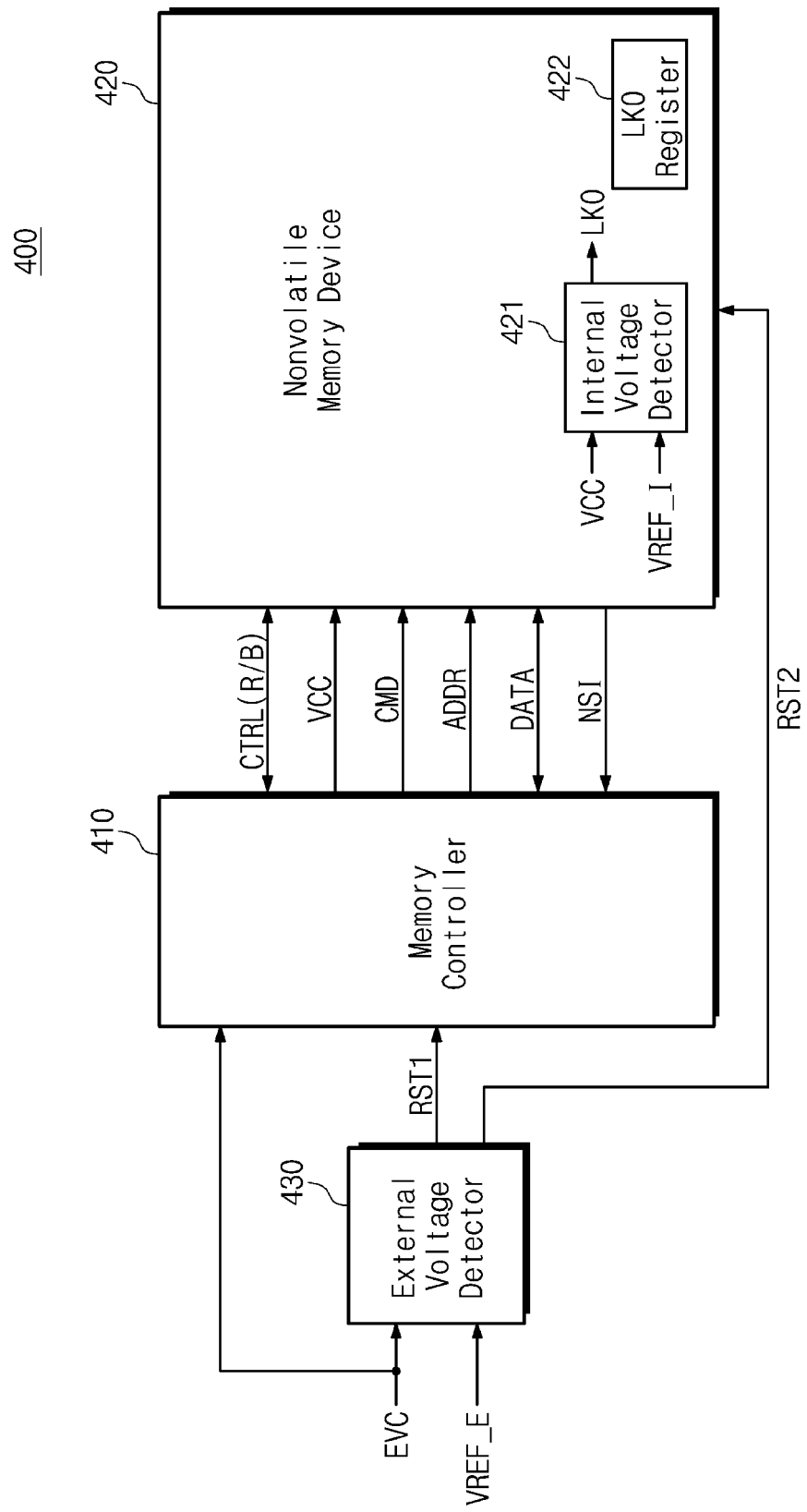
FIG. 18 illustrates a block diagram of a storage device according to an embodiment of the inventive concept.

FIG. 18 illustrates a block diagram of a storage device 400 according to an embodiment of the inventive concept. Referring to FIG. 18, the storage device 400 includes a memory controller 410, a nonvolatile memory device 420, and an external voltage detector 430. The nonvolatile memory device 420 includes an internal voltage detector 421 and a lock-out status register 422. The storage device 400 illustrated in FIG. 18 may include all functions of the storage device 100 of FIG. 1 and the storage device 200 of FIG. 10, and thus, a detailed description thereof will not be repeated here. The memory controller 410 and the nonvolatile memory device 420 are similar to the memory controller 110 and the nonvolatile memory device 120 of FIG. 1. Thus, detailed description of similar features and operations of the memory controller 410 and the nonvolatile memory device 420 will be omitted and the following description may focus on how the embodiment of FIG. 18 is different from the embodiment of FIG. 1.

The storage device 400 detects an abnormal external power supply voltage EVC in advance using the external voltage detector 430. That is, external voltage detector 430 compares the external power supply voltage EVC with the external reference voltage VREF_E, and transmits the first reset signal RST1 to the memory controller 410 and the second reset signal RST2 to the nonvolatile memory device 420 when the external power supply voltage EVC is lower than the external reference voltage VREF_E. In the storage device 400, the memory controller 410 and the nonvolatile memory device 420 may perform reset operations at the same time in response to the first reset signal RST1 and the second reset signal RST2 from the external voltage detector 430.

Also, the storage device 400 determines a failure block as one of a bad block or a normal block, based on whether the lock-out signal LKO is output from the internal voltage detector 421. In the case where the power supply voltage VCC provided from the memory controller 410 is lower than the internal reference voltage VREF_I, the internal voltage detector 421 outputs the lock-out signal LKO. The memory controller 410 receives lock-out status information stored in the lock-out status register 422 to determine whether the lock-out signal LKO is output. In the case where a program operation fails (i.e., a failure block occurs) and the nonvolatile memory device 420 outputs the lock-out signal LKO, the memory controller 410 determines a failure block as a normal block. In the case where the lock-out signal LKO is not output, the memory controller 410 determines the failure block as a bad block. In an embodiment, in case where a program loop is the maximum loop even though the lock-out signal LKO is output, the memory controller 410 determines the failure block as a bad block. In the case where the lock-out signal LKO is output and the program loop is not the maximum loop, the memory controller 410 determines the failure block as a normal block.

The storage device 400 may detect the abnormal external power supply voltage EVC in advance to allow the memory controller 410 and the nonvolatile memory device 420 to perform a reset operation in advance, thereby preventing the event that a recovery operation is not performed timely. Also, the storage device 400 may determine a failure block as a normal block depending on a given condition, thereby preventing an actually defect-free memory block from being determined as a bad block. Accordingly, the reliability of the storage device 400 may be improved.

Figure 19:
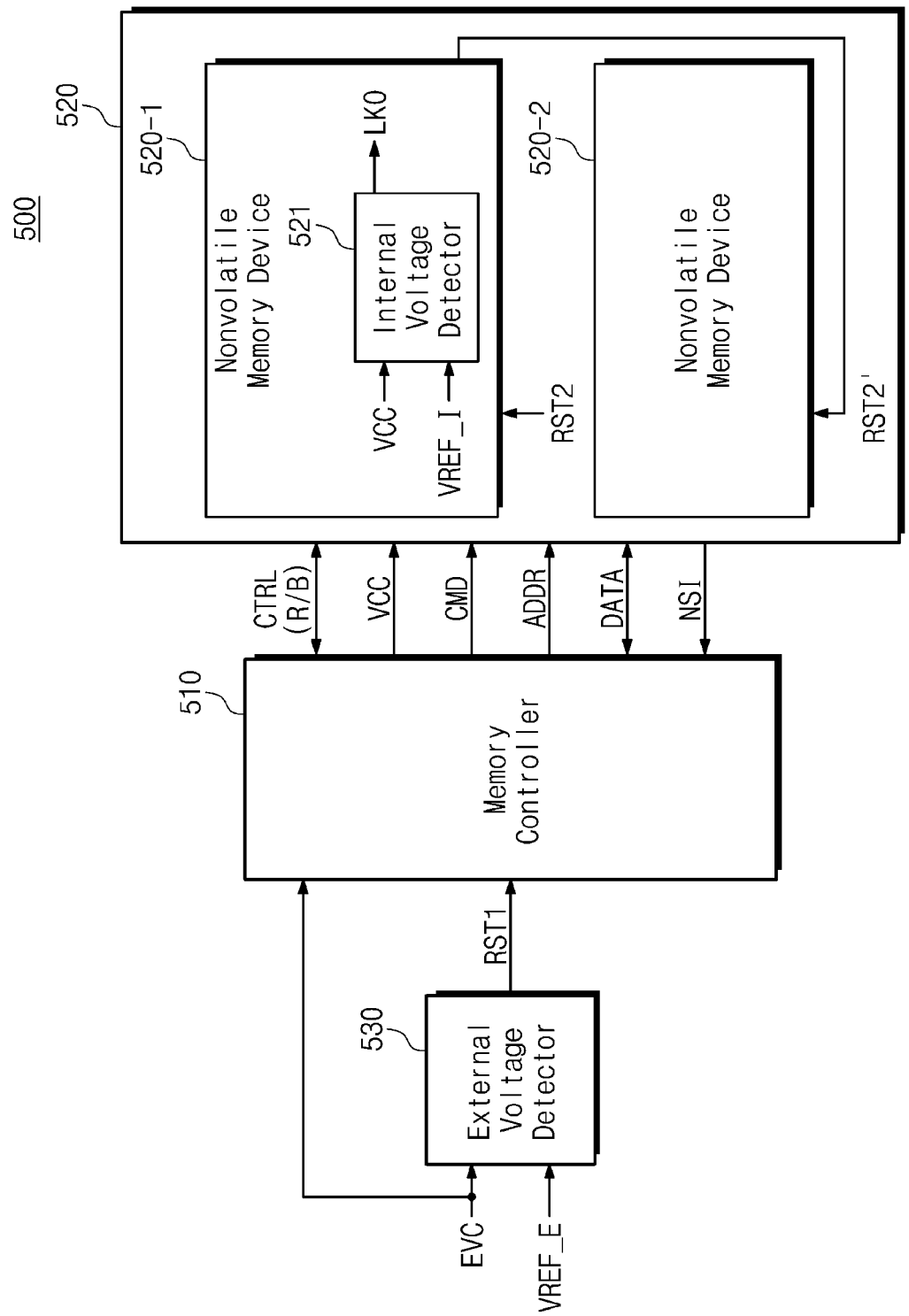
FIG. 19 illustrates a block diagram of a storage device according to an embodiment of the inventive concept.

FIG. 19 illustrates a block diagram of a storage device 500 according to an embodiment of the inventive concept. Referring to FIG. 19, the storage device 500 includes a memory controller 510, a nonvolatile memory device 520, and an external voltage detector 530. The nonvolatile memory device 520 includes a first nonvolatile memory device 520-1 and a second nonvolatile memory device 520-2. For example, each of the first and second nonvolatile memory devices 520-1 and 520-2 may be implemented with or as one package or one chip. The first nonvolatile memory device 520-1 includes an internal voltage detector 521. The storage device 500 illustrated in FIG. 19 includes all functions of the storage devices 100, 200, 300, and 400 of FIGS. 1, 10, 17, and 18, and thus detailed description of similar features and operations will be omitted and the following description may focus on how the embodiment of FIG. 19 is different from the above noted previous embodiments.

The first nonvolatile memory device 520-1 that is a reference device controls a reset operation of the second nonvolatile memory device 520-2. In an embodiment, the first nonvolatile memory device 520-1 outputs a new second reset signal RST2' to the second nonvolatile memory device 520-2. The second nonvolatile memory device 520-2 performs a reset operation in response to the new second reset signal RST2'.

For example, the first nonvolatile memory device 520-1 receives the second reset signal RST2 to perform the reset operation. The first nonvolatile memory device 520-1 may receive the second reset signal RST2 from the external voltage detector 530 or the memory controller 510. Upon receiving the second reset signal RST2, the first nonvolatile memory device 520-1 outputs the new second reset signal RST2' to the second nonvolatile memory device 520-2. The second nonvolatile memory device 520-2 receives the new second reset signal RST2' and performs a reset operation responsive thereto.

Alternatively, in the case where the internal voltage detector 521 outputs the lock-out signal LKO, the first nonvolatile memory device 520-1 outputs the new second reset signal RST2' to the second nonvolatile memory device 520-2. The second nonvolatile memory device 520-2 receives the new second reset signal RST2' and performs a reset operation responsive thereto.

Only first and second nonvolatile memory devices 520-1 and 520-2 are illustrated in FIG. 19. However, the inventive concept is not limited thereto. For example, the nonvolatile memory device 520 may further include other nonvolatile memory devices. Accordingly, the first nonvolatile memory device 520-1 may output the new second reset signal RST2' to a plurality of nonvolatile memory devices at the same time. As such, the plurality of nonvolatile memory devices included in the nonvolatile memory device 520 may perform reset operations at the same time.

Figure 20:
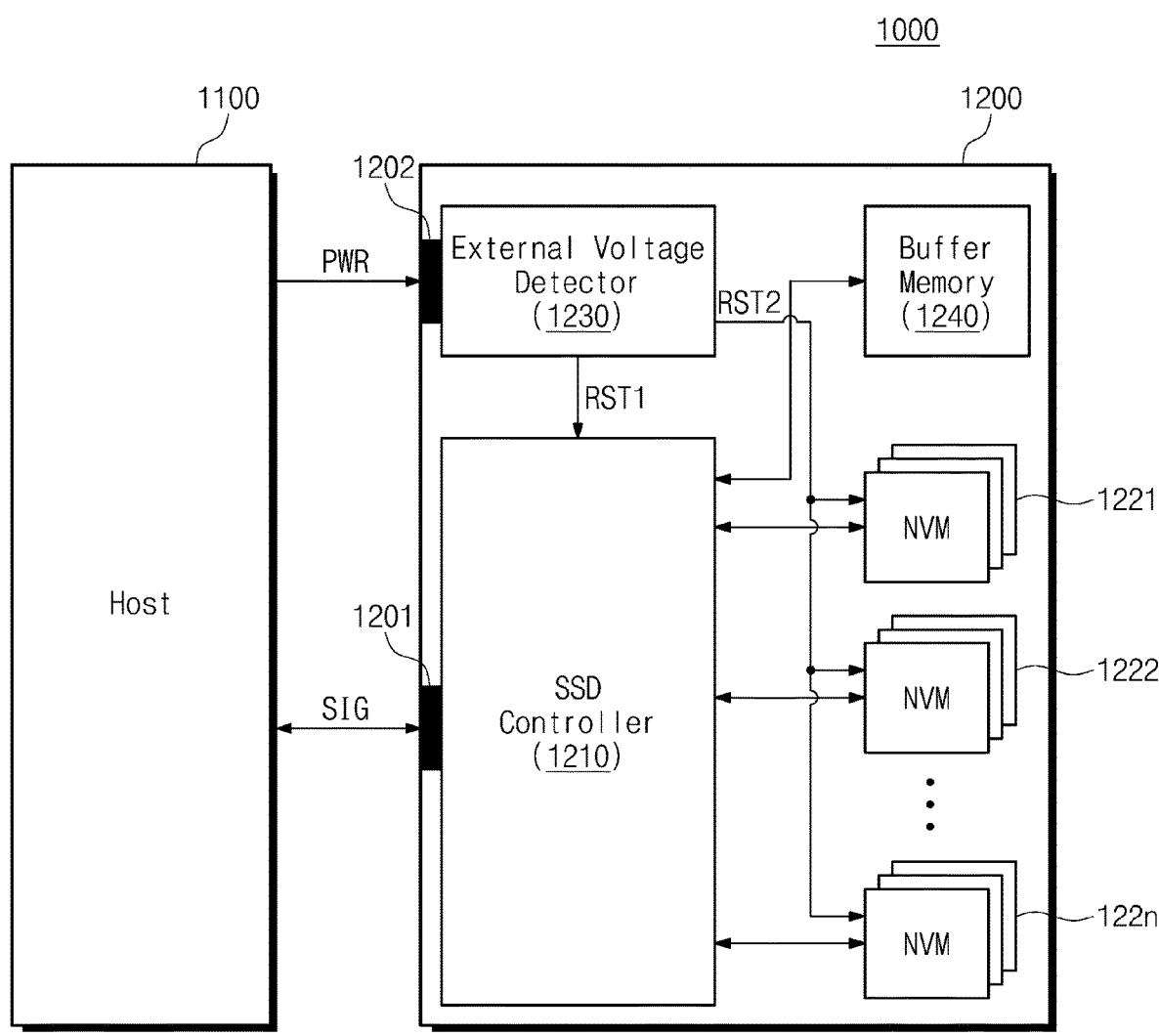
FIG. 20 illustrates a block diagram of a solid state drive system to which storage according to the inventive concept is applied.

FIG. 20 illustrates a block diagram of a solid state drive (SSD) system 1000 to which a storage device according to the inventive concept is applied. Referring to FIG. 20, the SSD system 1000 includes a host 1100 and an SSD 1200.

The SSD 1200 exchanges a signal SIG with the host 1100 through a signal connector 1201 and is supplied with power PWR through a power connector 1202. The SSD 1200 includes an SSD controller 1210, a plurality of flash memories (NVM) 1221, 1222 to 122n, an external voltage detector 1230, and a buffer memory 1240.

The SSD controller 1210 may control the flash memories 1221 to 122n in response to the signal SIG from the host 1100. The flash memories 1221 to 122n may operate under control of the SSD controller 1210. In the case where the magnitude of the power PWR input from the host 1100 is smaller than the magnitude of a reference voltage, the external voltage detector 1230 may output the first and second reset signals RST1 and RST2 respectively to the SSD controller 1210 and the plurality of flash memories 1221 to 122n. The SSD controller 1210 and the plurality of flash memories 1221 to 122n may perform reset operations in response to the first and second reset signals RST1 and RST2.

The buffer memory 1240 operates as a buffer memory of the SSD 1200. For example, the buffer memory 1240 may temporarily store data received from the host 1100 or from the flash memories 1221 to 122n, or may temporarily store metadata (e.g., a mapping table) of the flash memories 1221 to 122n. Alternatively, the buffer memory 1240 may temporarily store a variety of information needed for the SSD controller 1210 to operate.

In an embodiment, each of the flash memories 1221 to 122n may include a voltage detector described with reference to FIGS. 1 to 18. The voltage detector may output a lock-out signal based on the magnitude of a power supply voltage input to the flash memories 1221 to 122n. In the case where a program operation associated with the flash memories 1221 to 122n fails, the SSD controller 1210 may determine a failure block as a bad block or a normal block based on whether the lock-out signal is output. Also, in the case where the program operation associated with the flash memories 1221 to 122n fails, the SSD controller 1210 may determine a failure block as a bad block or a normal block based on whether the lock-out signal is output and whether a program loop is the maximum loop.

According to the inventive concept, a defect-free memory block may be prevented from being determined as a bad block, thereby securing a storage space through the reuse of a memory block. Also, in the case where an unstable external power supply voltage is detected, an operation state of a storage device may be changed to a standby state, and thus, the storage device may be powered off stably. Accordingly, there may be provided an operating method of a memory controller, a storage device including the memory controller, and an operating method of the storage device, capable of improving reliability.

While the inventive concept has been described with reference to the various embodiments, it will be apparent to those skilled in the art that various changes and modifications may be made without departing from the spirit and scope of the inventive concept. Therefore, it should be understood that the above embodiments are not limiting, but illustrative.

What is claimed is:

1. An operating method of a memory controller which controls a nonvolatile memory device, the method comprising:
   receiving, by the memory controller, information about operation failure from the nonvolatile memory device;
   determining, by the memory controller, a memory block of the nonvolatile memory device corresponding to the information about the operation failure as a failure block;
   receiving, by the memory controller, lock-out status information from the nonvolatile memory device;
   determining, by the memory controller, whether a lock-out signal is output by the nonvolatile memory device, based on the lock-out status information; and
   determining, by the memory controller, the failure block as a normal block or a bad block depending on the determining whether the lock-out signal is output,
   wherein the failure block is determined as the normal block when the lock-out signal is output.

2. The operating method of claim 1, wherein the operation failure comprises one of a program operation failure, an erase operation failure, or a read operation failure, and the failure block is from among a plurality of memory blocks included in the nonvolatile memory device.

3. The operating method of claim 1, further comprising invalidating data of the failure block, by the memory controller, when the failure block is determined as the normal block.

4. The operating method of claim 1, further comprising:
   performing a reset operation, by the memory controller, when the failure block is determined as the normal block,
   wherein the performing of the reset operation comprises transmitting a reset signal to the nonvolatile memory device.

5. The operating method of claim 1, wherein the failure block is determined as the bad block when the lock-out signal is not output.

6. The operating method of claim 5, further comprising when the failure block is determined as the bad block, marking block information corresponding to the failure block as the bad block and storing the block information as metadata.

7. The operating method of claim 1, further comprising:
   receiving, by the memory controller, maximum loop status information from the nonvolatile memory device, the maximum loop status information representing whether an operation loop in which the operation failure occurs is a maximum loop; and determining, by the memory controller, whether the operation loop is the maximum loop, based on the maximum loop status information, wherein the determining of the failure block as the normal block or the bad block comprises determining the failure block as one of the normal block or the bad block based on whether the lock-out signal is output and whether the operation loop is the maximum loop.

8. The operating method of claim 7, wherein the failure block is determined as the normal block when the lock-out signal is output and the operation loop is not the maximum loop.

9. An operating method of a storage device comprising a memory controller which controls a nonvolatile memory device, the operating method comprising:

performing, by the memory controller, an operation from among a program operation, a read operation, and an erase operation on a memory block of the nonvolatile memory device;

determining, by the memory controller, the memory block as a failure block when the operation fails;

determining, by the memory controller, whether a lock-out signal is output by the nonvolatile memory device, when the operation fails; and determining, by the memory controller, the failure block as a normal block or a bad block depending on the determining whether the lock-out signal is output, wherein the failure block is determined as the bad block when the lock-out signal is not output.

10. The operating method of claim 9, wherein the failure block is determined as the normal block when the lock-out signal is output.

11. The operating method of claim 9, further comprising:

comparing, by the nonvolatile memory device, a power supply voltage and a reference voltage;

outputting, by the nonvolatile memory device, the lock-out signal when the power supply voltage is lower than the reference voltage; and storing, by the nonvolatile memory device, lock-out status information based on whether the lock-out signal is output.

12. The operating method of claim 11, wherein the determining whether the lock-out signal is output comprises:

checking the lock-out status information; and determining that the lock-out signal is output, based on the checking the lock-out status information.

13. The operating method of claim 9, further comprising determining whether an operation loop in which the operation fails is a maximum loop, and wherein the determining the failure block as the normal block or the bad block comprises determining the failure block as one of the normal block or the bad block based on whether the lock-out signal is output and whether the operation loop is the maximum loop.

14. The operating method of claim 13, wherein the failure block is determined as the normal block when the lock-out signal is output and the operation loop is not the maximum loop.

15. A storage device comprising:

a nonvolatile memory device comprising a plurality of memory blocks; and a memory controller configured to control the nonvolatile memory device, wherein the memory controller is further configured to determine whether a lock-out signal is output by the nonvolatile memory device based on lock-out status information from the nonvolatile memory device, determine a memory block, from among the plurality of memory blocks, corresponding to information about operation failure received from the nonvolatile memory device as a failure block, and determine the failure block as a normal block or a bad block depending on whether the lock-out signal is output, wherein the memory controller is configured to determine the failure block as the normal block when the lock-out signal is output.

16. The storage device of claim 15, wherein the memory controller is configured to determine the failure block as the bad block when the lock-out signal is not output.

17. The storage device of claim 15, wherein the nonvolatile memory device comprises:

a voltage detector configured to detect whether a power supply voltage provided to the nonvolatile memory device is lower than a reference voltage and to output the lock-out signal when the power supply voltage is lower than the reference voltage; and a lock-out status register configured to store the lock-out status information based on whether the lock-out signal is output.

18. The storage device of claim 15, wherein the nonvolatile memory device is configured to transmit to the memory controller maximum loop status information representing whether an operation loop in which the operation failure occurs is a maximum loop, and wherein the memory controller is configured to determine whether the operation loop is the maximum loop based on the maximum loop status information, and to determine the failure block as one of the normal block or the bad block based on whether the lock-out signal is output and whether the operation loop is the maximum loop.

19. The storage device of claim 18, wherein the memory controller is configured to determine the failure block as the normal block when the lock-out signal is output and the operation loop is not the maximum loop.

* * * * *